(12) United States Patent
Gobbers et al.

(10) Patent No.: US 6,247,718 B1
(45) Date of Patent: Jun. 19, 2001

(54) WHEELCHAIR FOR HANDICAPPED

(76) Inventors: Dieter Gobbers; Walters Gobbers, both of P.O. Box 1537, Lehigh Acres, FL (US) 33970

( * ) Notice: Subject to any disclaimer, the term of this patent is extended or adjusted under 35 U.S.C. 154(b) by 0 days.

(21) Appl. No.: 09/300,775

(22) Filed: Apr. 27, 1999

(30) Foreign Application Priority Data

Apr. 27, 1998 (DE) ............................................. 198 18 821

(51) Int. Cl.[7] ...................................................... B62B 3/02
(52) U.S. Cl. ................. 280/304.1; 180/65.1; 280/47.41; 254/7 R
(58) Field of Search ................... 180/65.1, 65.5, 180/65.6, 65.7, 65.8, DIG. 4; 280/638, 250.1, 657, 658, 304.1, 47.38, 47.41; 254/7 C, 7 R

(56) References Cited

U.S. PATENT DOCUMENTS

| | | |
|---|---|---|
| 1,585,291 | 5/1926 | Jordan . |
| 1,927,598 | 9/1933 | Schlichter . |
| 3,103,384 | 9/1963 | Zivi . |
| 4,786,032 | 11/1988 | Garman et al. . |

FOREIGN PATENT DOCUMENTS

| | | |
|---|---|---|
| 368750 | 3/1932 | (AU) . |
| 1 065 154 | 9/1959 | (DE) . |
| 25 27 544 | 1/1976 | (DE) . |
| 84 06 917 U | 9/1984 | (DE) . |
| 84 28 775 U | 4/1985 | (DE) . |
| 38 05 431 | 3/1989 | (DE) . |
| 44 37 515 | 4/1996 | (DE) . |
| 0 067 069 | 12/1982 | (EP) . |
| 0 594 378 | 4/1994 | (EP) . |
| 0 687 455 | 12/1995 | (EP) . |
| 642 561 | 8/1928 | (FR) . |
| WO 88/07848 | 10/1988 | (WO) . |

Primary Examiner—Richard M. Camby
(74) Attorney, Agent, or Firm—Ohlandt, Greeley, Ruggiero & Perle, LLP

(57) ABSTRACT

A wheelchair has a lifting device for raising and lowering the seat or frame of the wheelchair to permit a handicapped person to reach items above or below his reach. The lifting device includes four telescopic transmission elements that are driven in unison by a motor to raise or lower the seat or frame. When in a retracted position, the lifting device fits within the frame and below the seat of the wheelchair.

14 Claims, 26 Drawing Sheets

WHEELCHAIR FOR HANDICAPPED

BACKGROUND OF THE INVENTION

1. Field of the Invention

The invention concerns a wheelchair for handicapped persons. Such wheelchairs comprise a seat, a frame, and in most cases a drive mechanism. Generally this is an electrical-motor drive with battery.

2. Description of the Prior Art

The previously known wheelchairs have a serious disadvantage. The handicapped person is found at a specific height above the floor when the wheelchair is used. In this position, the handicapped person can, in fact, perform several activities of daily life, for example, opening doors or turning on the television. For other activities, however, the position is unfavorable, since it is too high or too low. If he wishes to plug an electrical plug into a plug socket, then the position can be too high. If he wishes to press the switch in an elevator or to use a normal speaker's podium, then the position can be too low.

SUMMARY OF THE INVENTION

The invention takes on the task of indicating a wheelchair, which is configured in such a way that the user can adapt his height position to the respective requirements. The wheelchair will be found in a stable.

In this way, the following is achieved individually: The handicapped person can adjust his seat height at any time with such a wheelchair. The adjustment is not in steps. It is also free of shocks and it is avoided that the adjustment causes the user any discomfort or even pain. The necessary stability is also achieved by the telescopic construction with threaded elements with the appropriate element diameter, and this stability is also maintained in the extended state.

BRIEF DESCRIPTION OF THE DRAWINGS

The invention is explained in more detail on the basis of the drawing. Therein, the following is shown individually.

Figure 1:
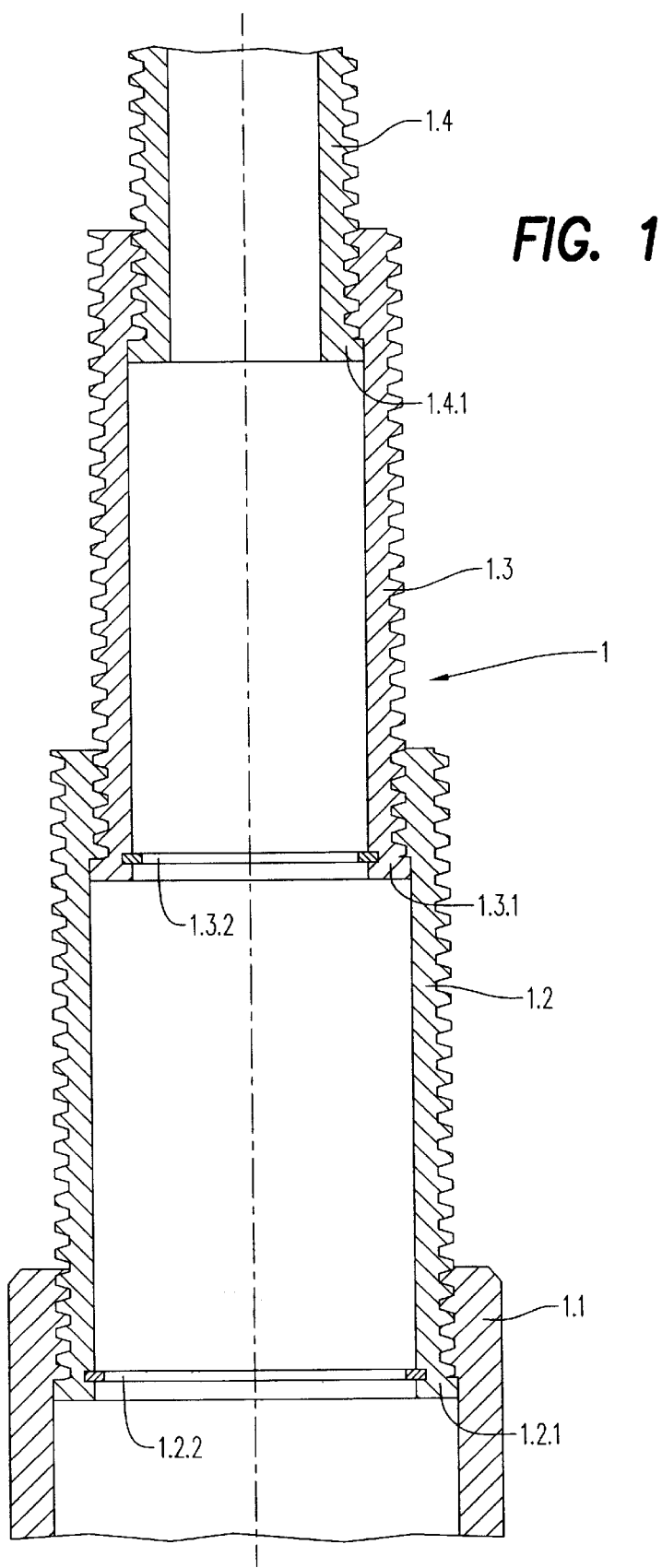
FIG. 1 illustrates a column built up of individual elements in the extended state.

The column 1 shown in FIG. 1 is built up of several cylindrical elements 1.1 to 1.4. As can be seen, elements 1.2, 1.3 and 1.4 are provided with outer threads. Elements 1.1, 1.2, 1.3 also have an inner thread each time in their upper region. All threads are trapezoidal threads in the present case. However, other thread profiles could also be provided, for example, round threads.

The power transmission device shown here is represented in an extended state.

Element 1.2 has a collar 1.2.1 at its foot. Element 1.3 has a collar 1.3.1 at its foot. Element 1.4 has a collar 1.4.1 at its foot. These collars serve as a stop and prevent the complete excursion of the respective element from the element found underneath each time. They also serve for guiding and for taking up bending forces.

Elements 1.2 and 1.3 are also—again in the foot region—provided with a locking ring 1.2.2 or 1.3.2. These locking rings also serve as stops in retracting the individual elements into one another, so that one element is prevented from "passing through" the one found below it. Thus, for example, collar 1.3.1 provides the stop when screwing element 1.3 down toward locking ring 1.2.2 of element 1.2.

FIG. 1a again shows a column built up from individual elements in the extended state. Collars 1.2.1, 1.3.1 and 1.4.1 are recognized, which can also be seen in FIG. 1.

The inner and outer threads of the individual elements 1.1, 1.2, 1.3 and 1.4 are again trapezoidal threads.

The special features lie in the following:

The thread of each element ends suddenly in its lower region, i.e., without a smooth runout. The screw thread undercut thus ends with a surface 1.2.4, 1.3.4, 1.4.4 essentially perpendicular to the axis. A stop surface 1.2.5, 1.3.5, 1.4.5 of the thread rib that belongs to it corresponds to the named end surfaces of any one of screw thread undercuts. Thus stops are created, which prevent a further rotation in the sense of excursion of the individual elements from one another.

Figure 1A:
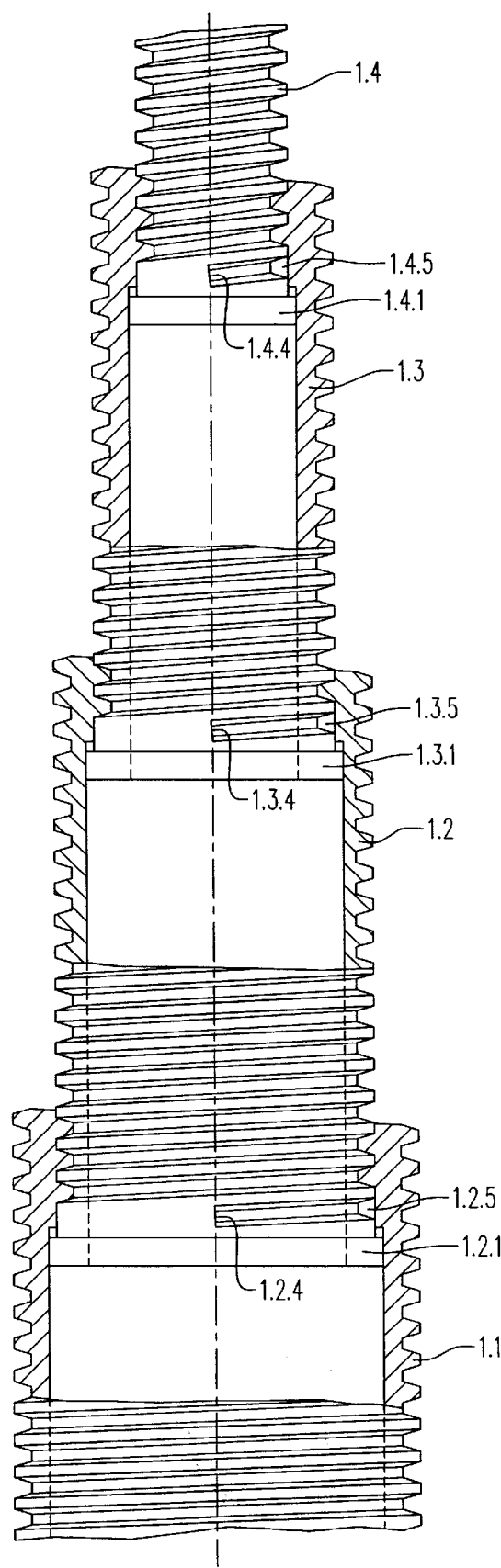
FIGS. 1a–1d—individual features of the individual elements can be recognized.
Figure 1B:
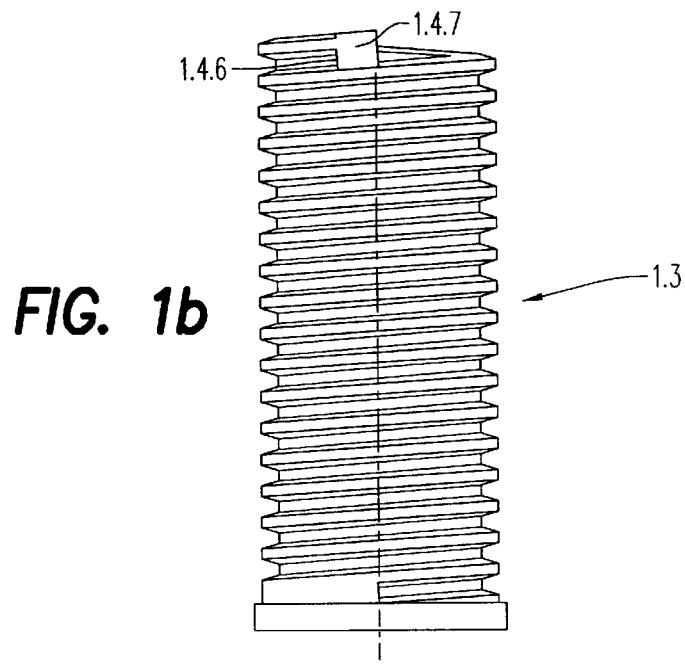
Figure 1C:
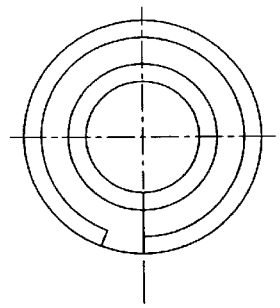
Figure 1D:
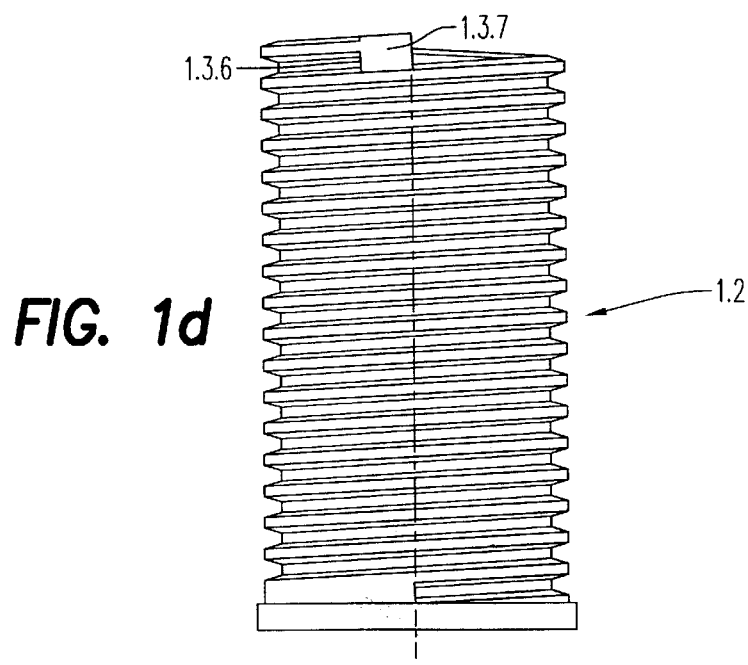

FIG. 1b again shows element 1.3, FIG. 1d shows element 1.2 and FIG. 1c shows the two elements in top section.

As can be seen, the threads are configured similarly in the upper region as in the lower region. Thus the last thread turn for element 1.3 ends suddenly with a stop surface 1.4.6, without gradually disappearing. For element 1.2, one recognizes the stop surface 1.3.6. Thus the stop surfaces are formed from blocking parts 1.4.7 or 1.3.7, which are self-contained components and which are rigidly joined, for example, by screwing with the respective element.

One advantage of this form of embodiment consists of the fact that the locking rings, which are shown in FIG. 1—see locking rings 1.2.2 and 1.3.2 therein—can be omitted.

Figure 2:
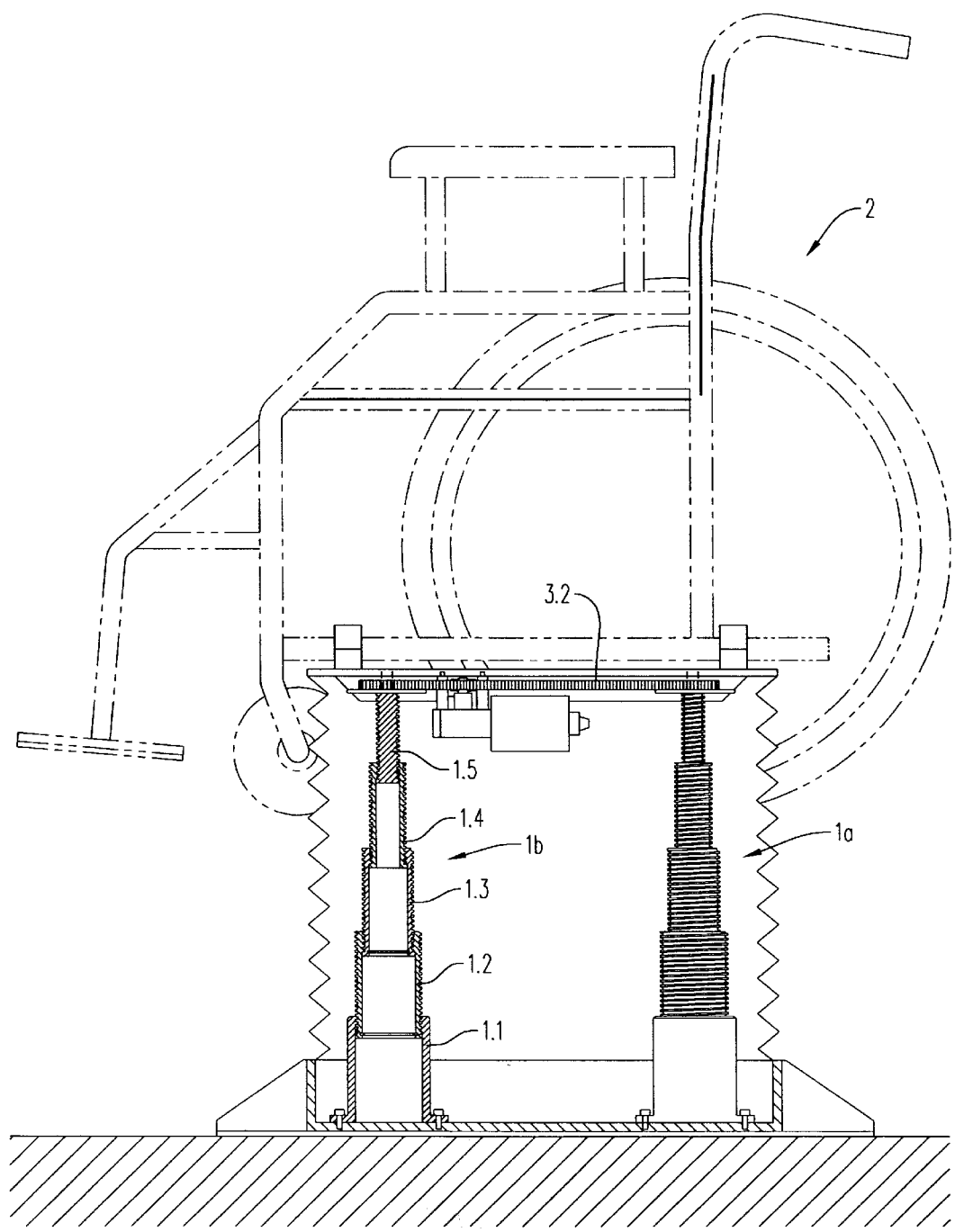
FIGS. 2–8 illustrate the application of the invention to the case of a wheelchair.

Taken individually, the following is recognized from FIG. 2: A lifting device, which has four columns as a power-transmission device, is assigned to a wheelchair 2. Of the four columns, the two front ones 1a and 1b can be seen. The columns are shown in the extended state, and in fact, in the highest attainable position.

The columns are essentially constructed like those according to FIG. 1.

A drive 3 is provided. The latter comprises an electrical motor 3.1. It also comprises four chain wheels. Each time, one of these chain wheels is arranged resistant to rotation at the uppermost element of the column concerned. All chain wheels are looped by a chain 3.2. Further, chain 3.2 loops around a drive pinion, which can be driven by motor 3.1. If chain 3.2—seen from the top—runs in the clockwise direction, then first the upper element screws into the second element from the top, and thus for column 1b, element 1.5 [screws into] element 1.4. In this way, if element 1.5 is extensively completely penetrated into element 1.4, then the two elements come to a stop relative to one another—see in this regard, FIG. 1, with the collars and locking rings represented therein. If chain 3.2 runs further in the clockwise direction, then there is also a screwing in of element 1.4 into element 1.3, etc. In the case of this entire process, a reduction of the lifting height of wheelchair 2 occurs.

If one then runs motor 3.1 in the direction opposite to this, then there is accordingly an opposite running of chain 3.2, thus in the counterclockwise direction. Again this leads to a travelling out of the individual elements from one another and thus to a raising of wheelchair 2.

The threads of the elements of the individual columns are self-restraining. Once a lifting height has been obtained, it thus also remains under load, and no special safety measures are needed for this. However, such [measures] can also be used.

The different components of the lifting device of the wheelchair are to be arranged at such a height above the floor, that the wheelchair traveler can overcome impediments, such as door thresholds, etc.

Figure 3:
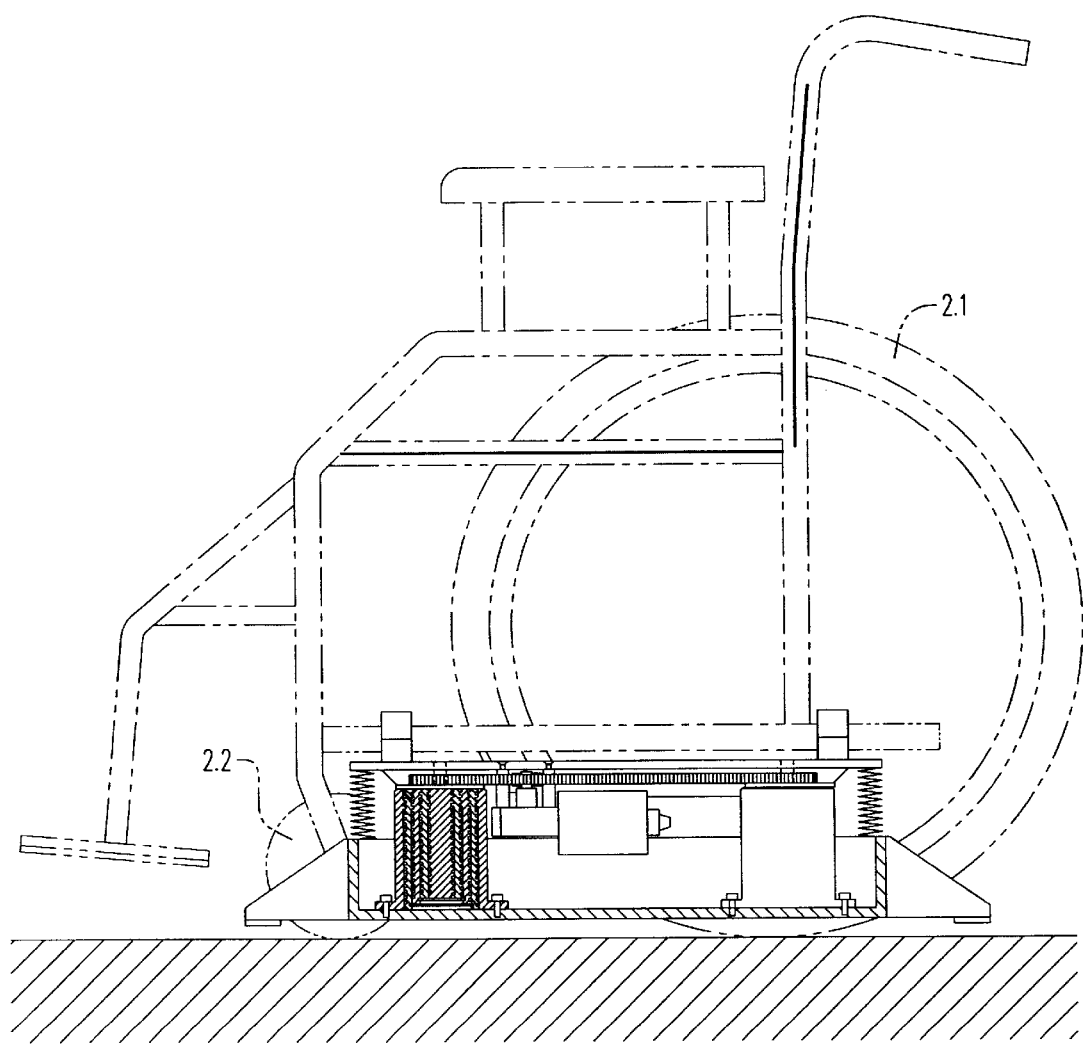

FIG. 3 shows the subject of FIG. 2 in the retracted state. All elements are now nested in one another. The wheels 2.1, 2.2 of the wheelchair now again have contact with the floor.

Figure 4:
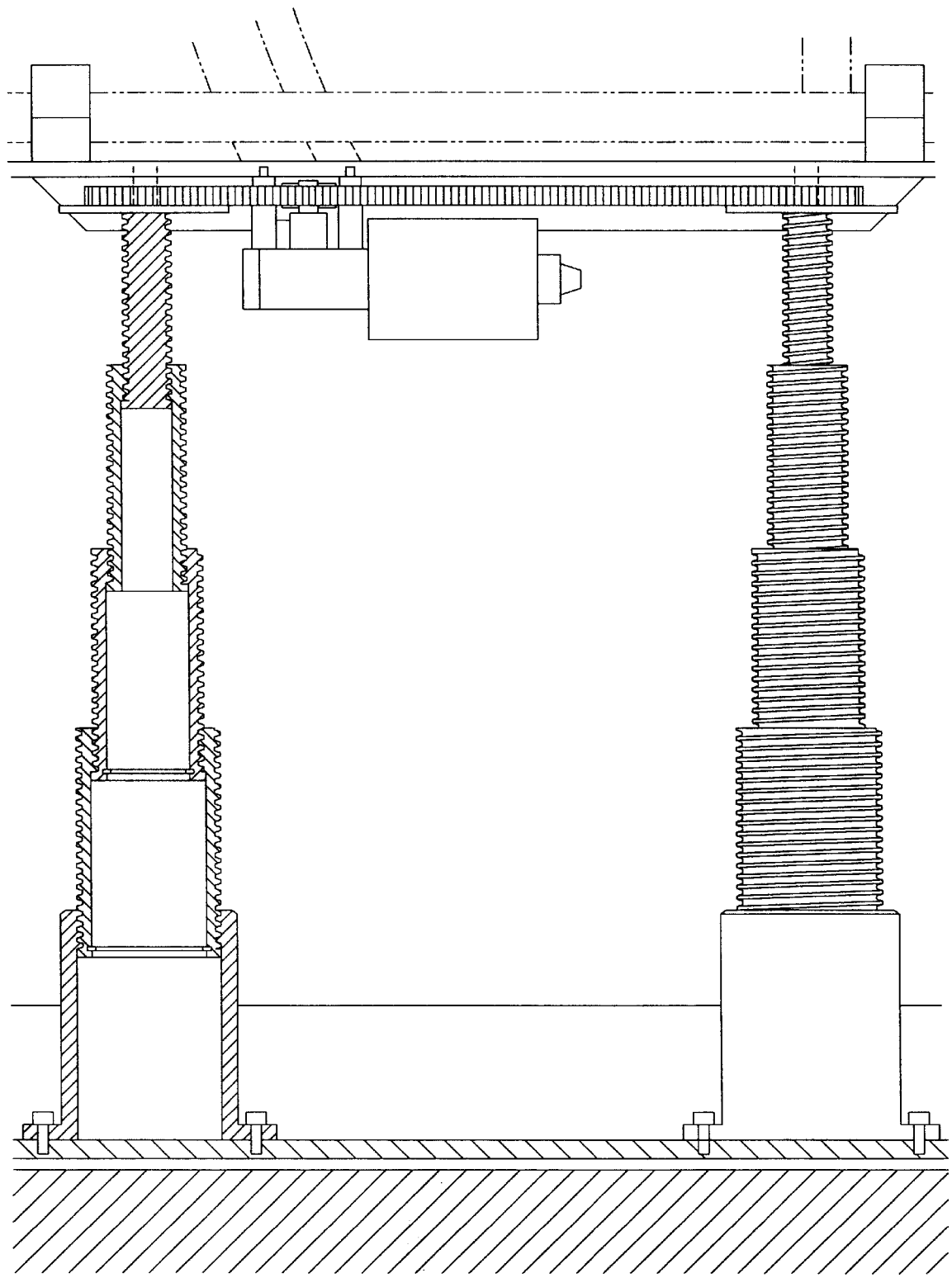
Figure 5:
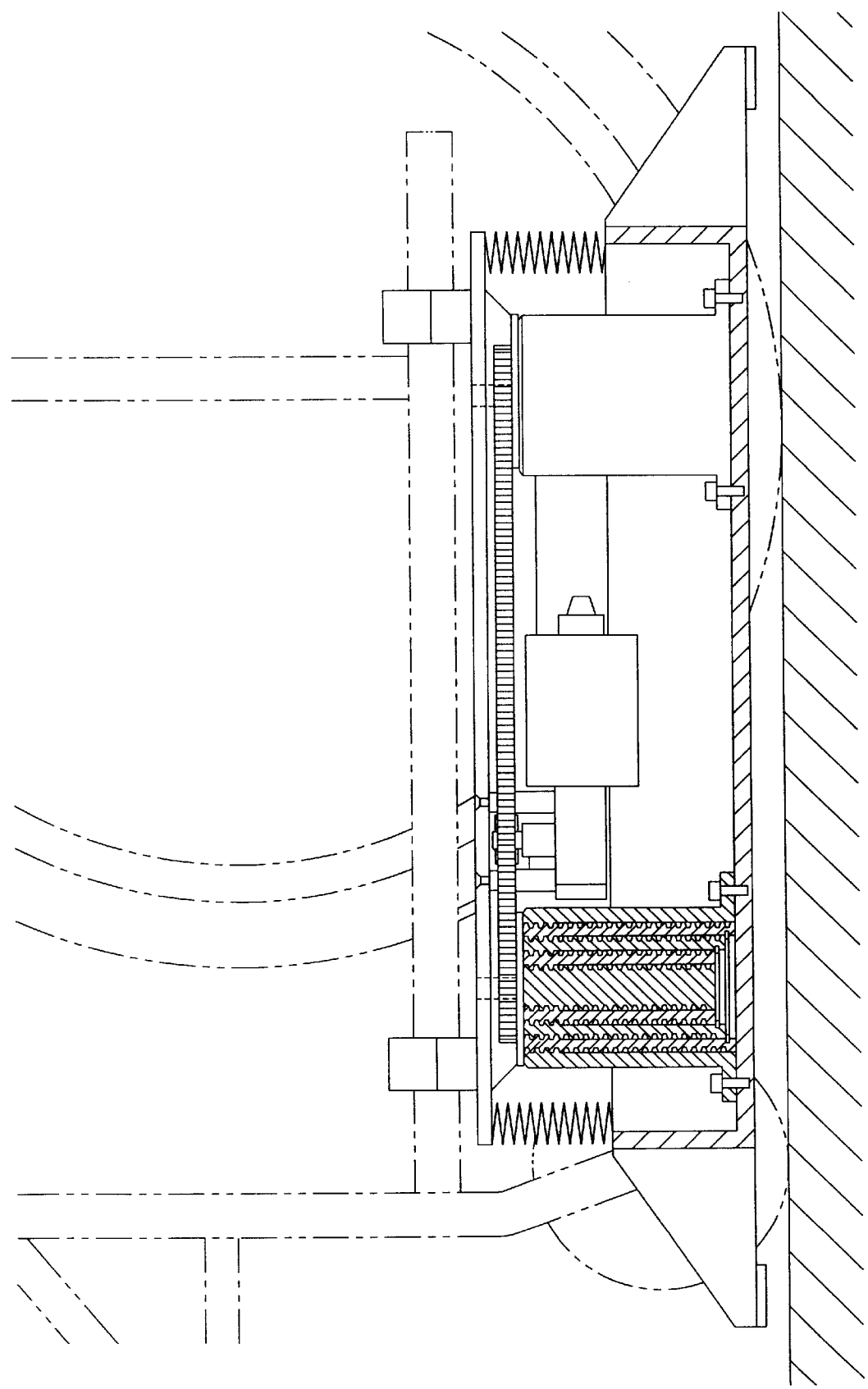

FIGS. 4 and 5 show the subject of FIG. 1 in enlarged representation, one time extended (FIG. 4) and one time retracted (FIG. 5).

Figure 6:
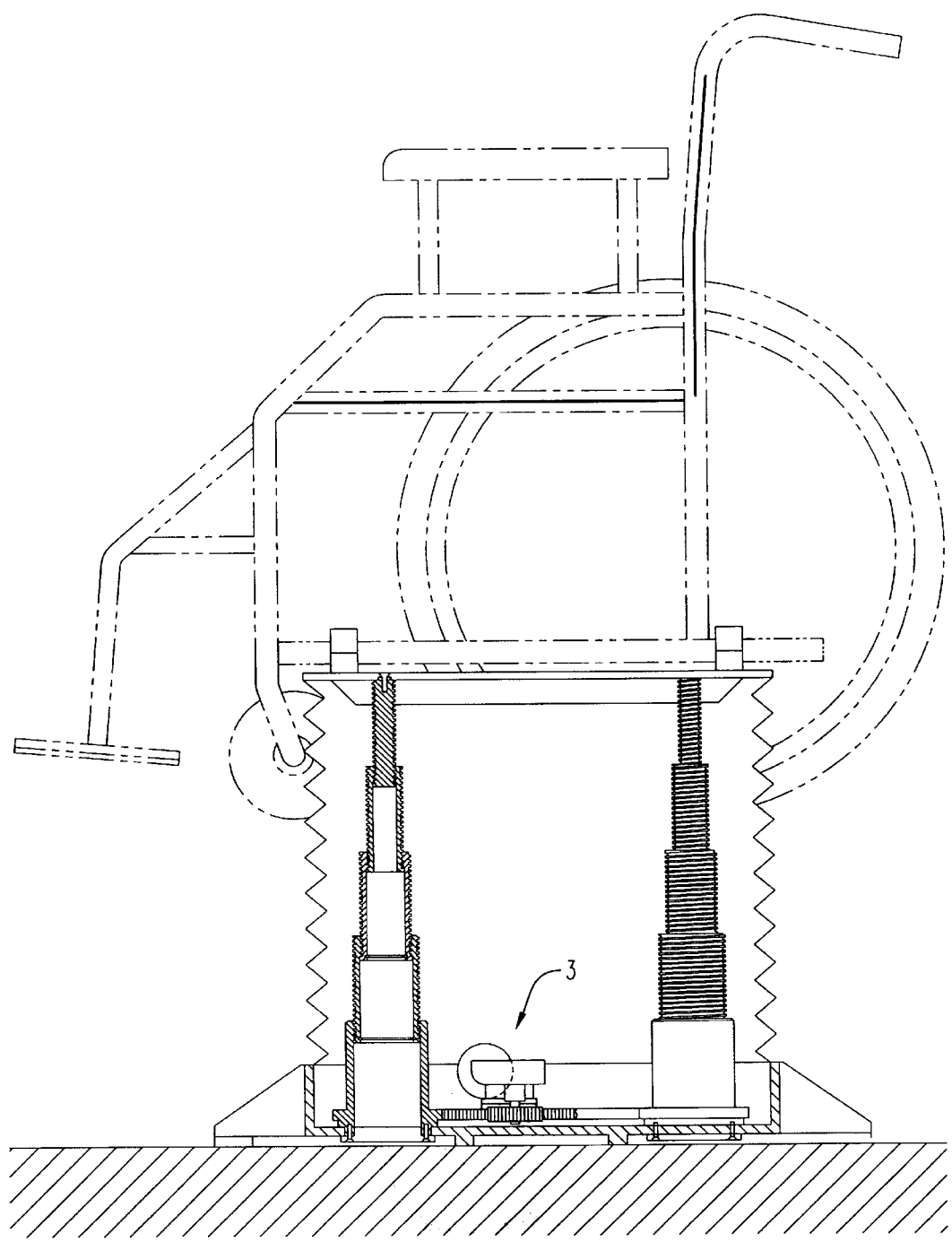
Figure 7:
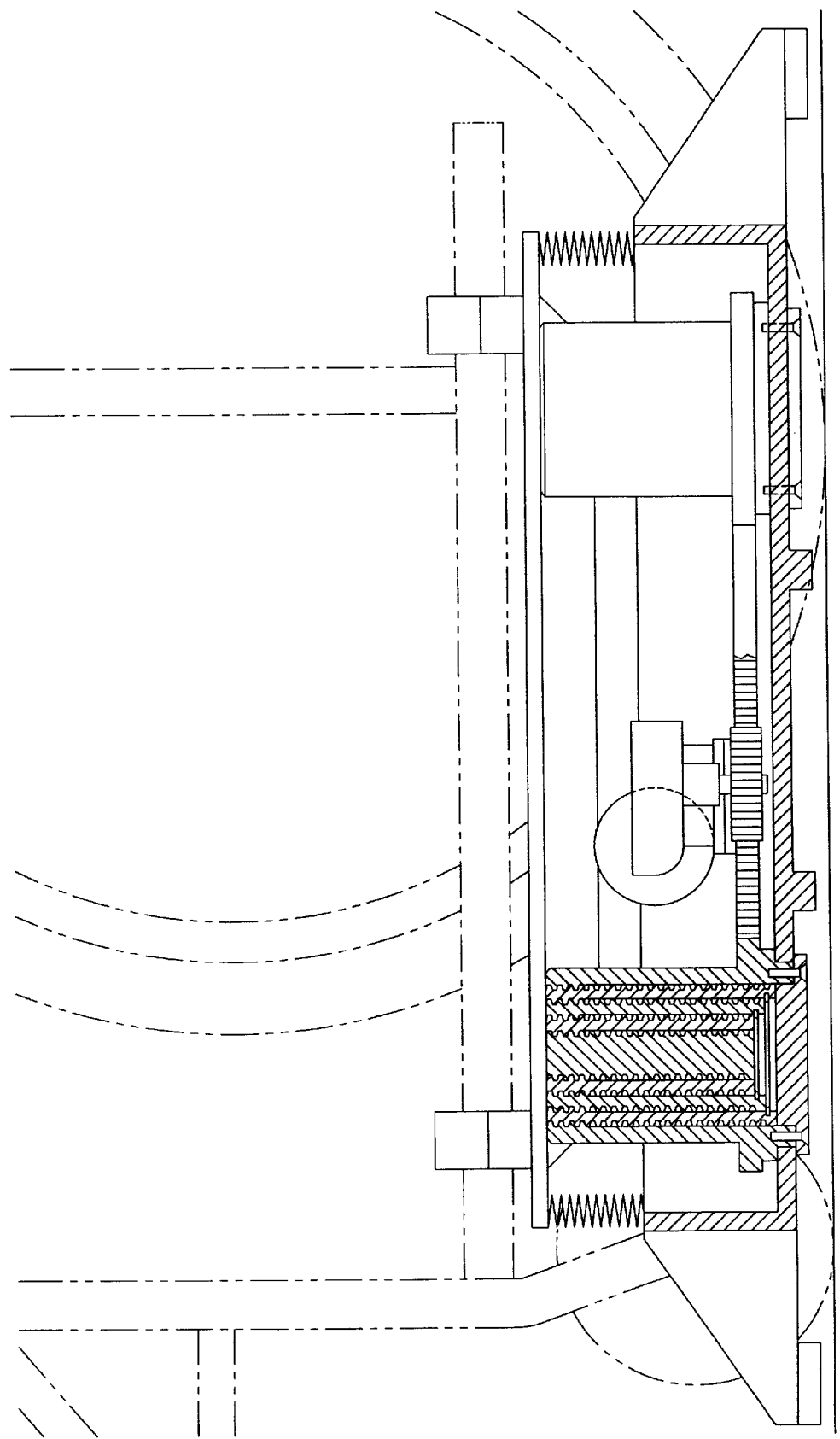
Figure 8:
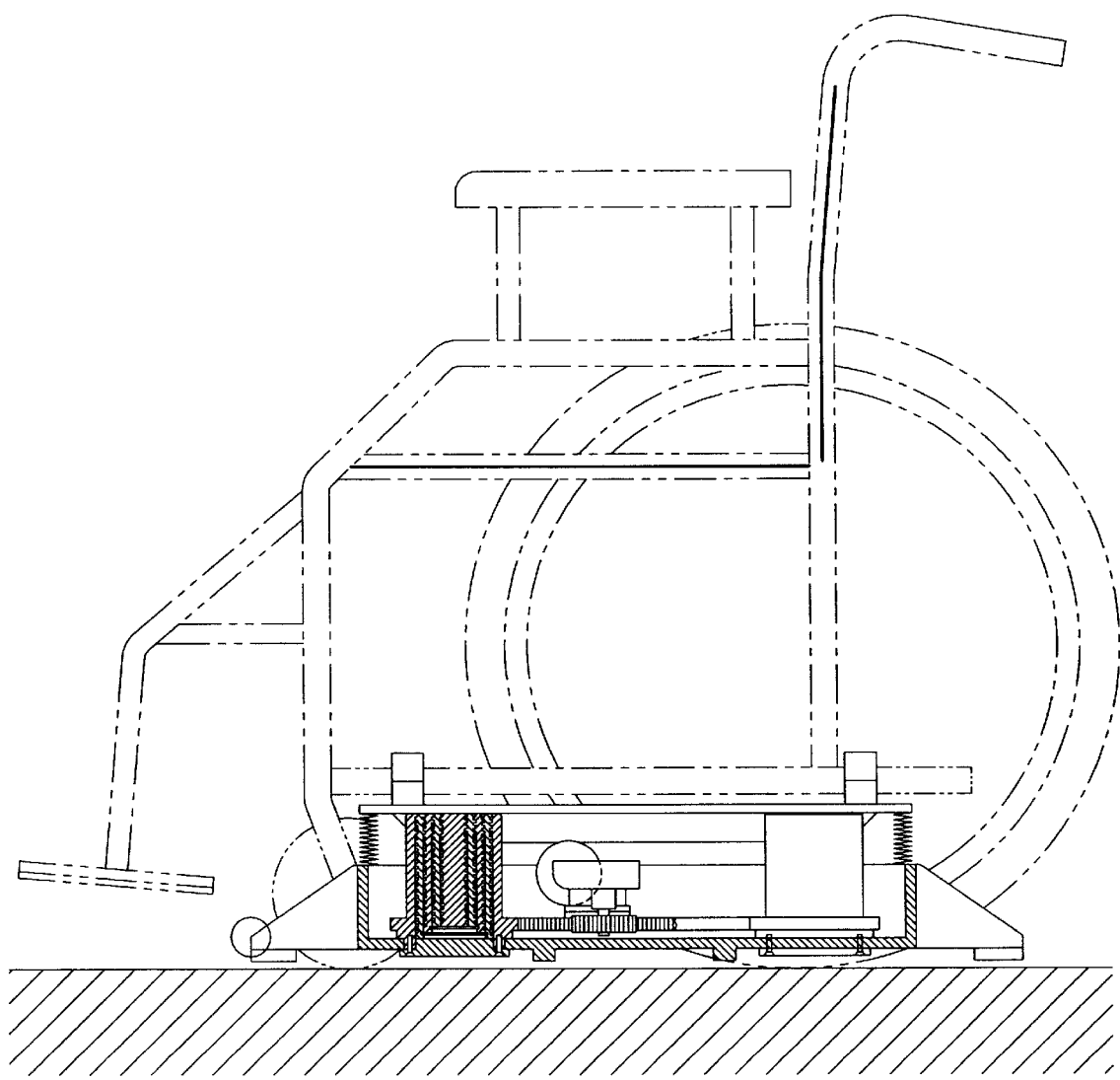
Figure 9:
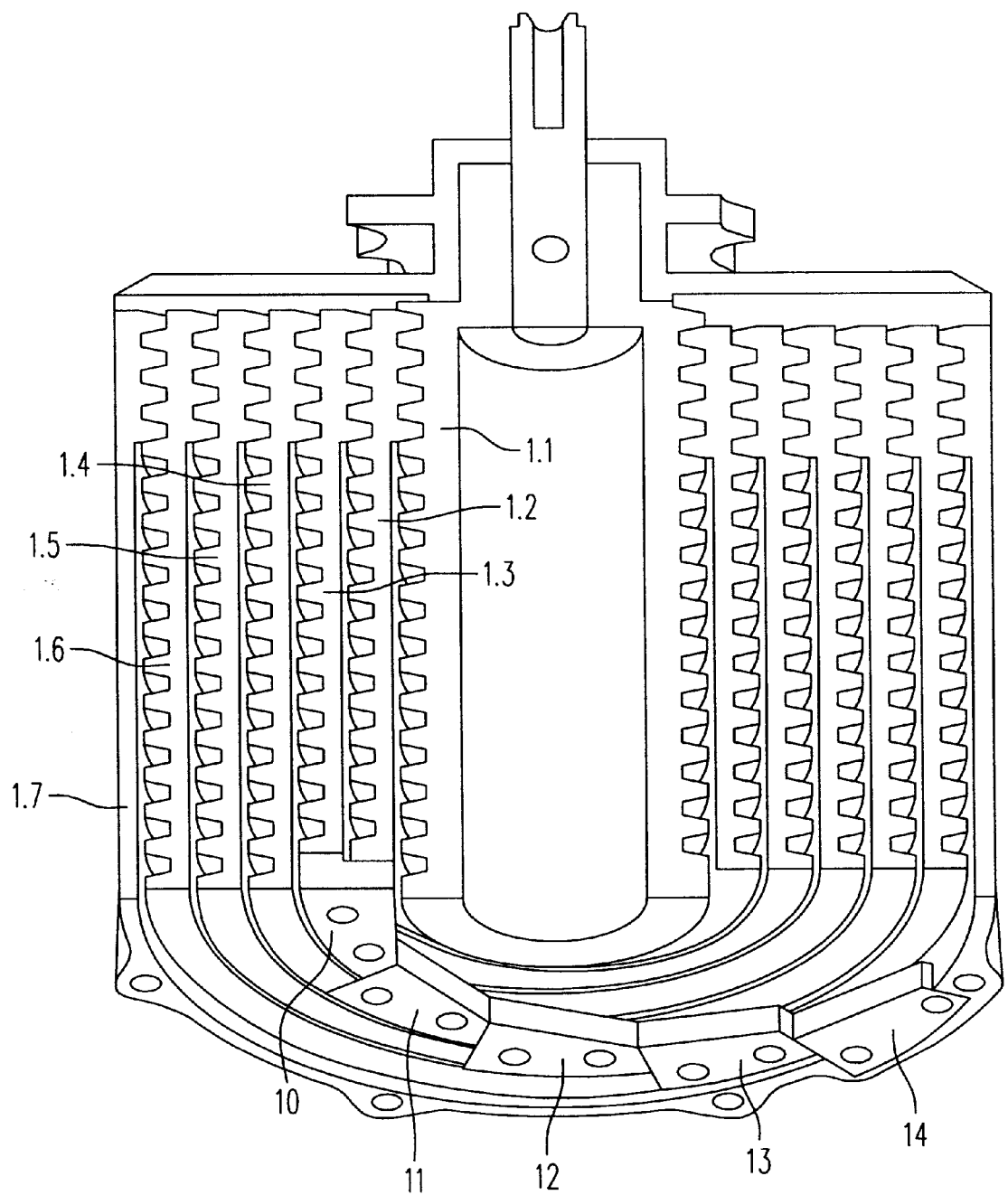
FIG. 9 shows in an enlarged representation a packet formed of several threaded elements in the retracted state shown in a perspective drawing from the bottom.
Figure 10:
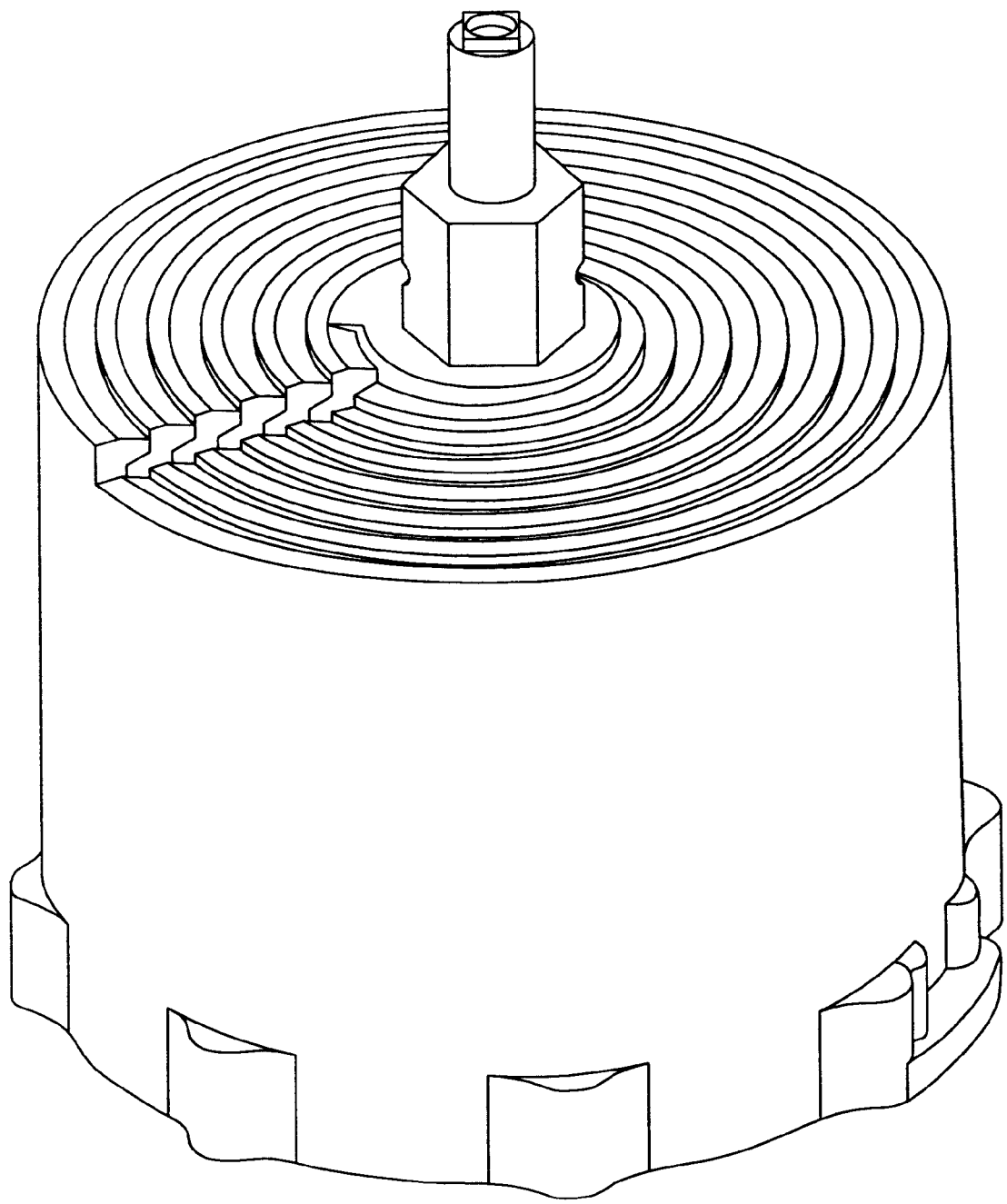
FIG. 10 shows such a packet in perspective representation shown from the bottom in section.
Figure 11:
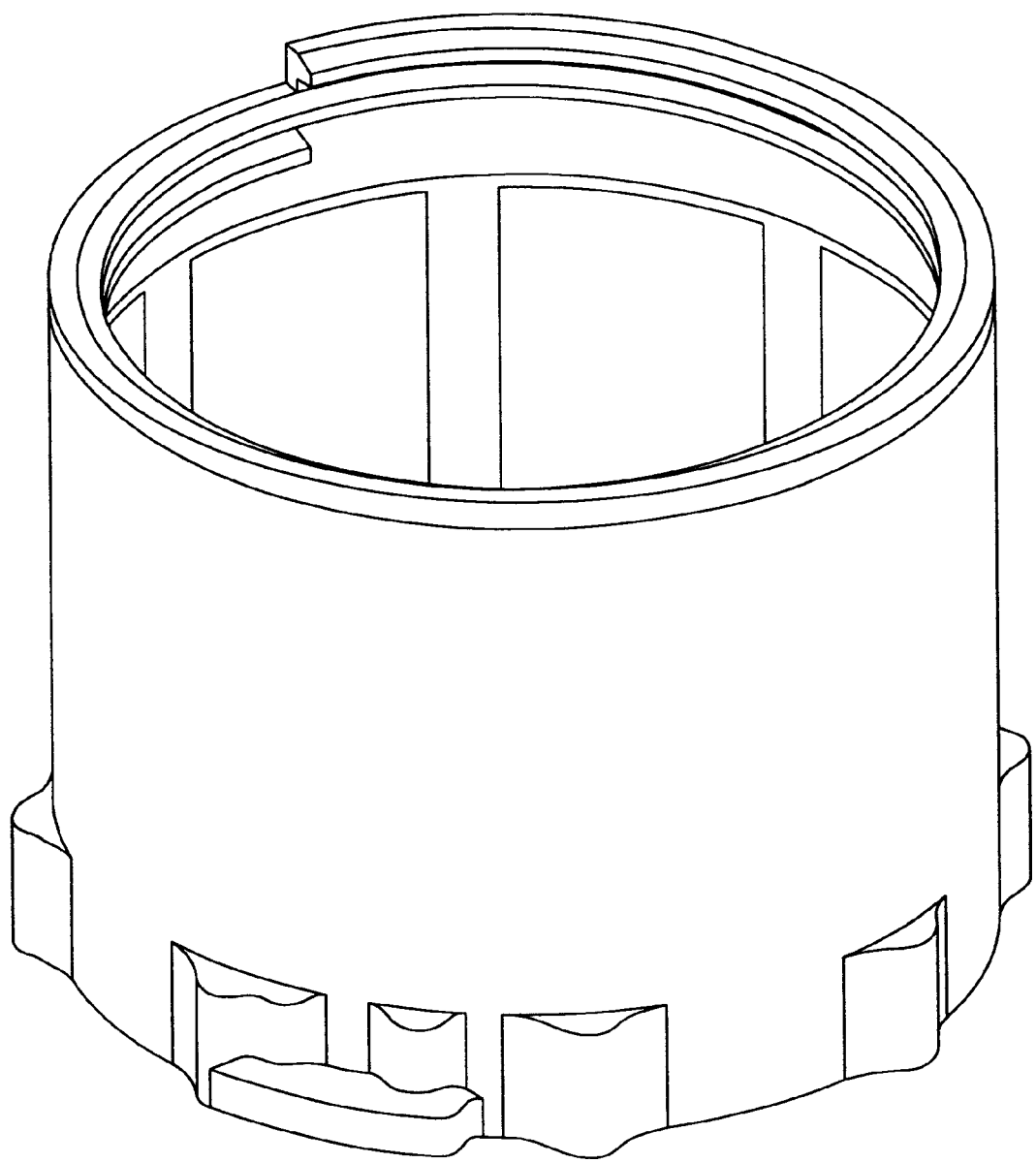
FIG. 11 shows the lowermost (outermost) threaded element in perspective representation.
Figure 12:
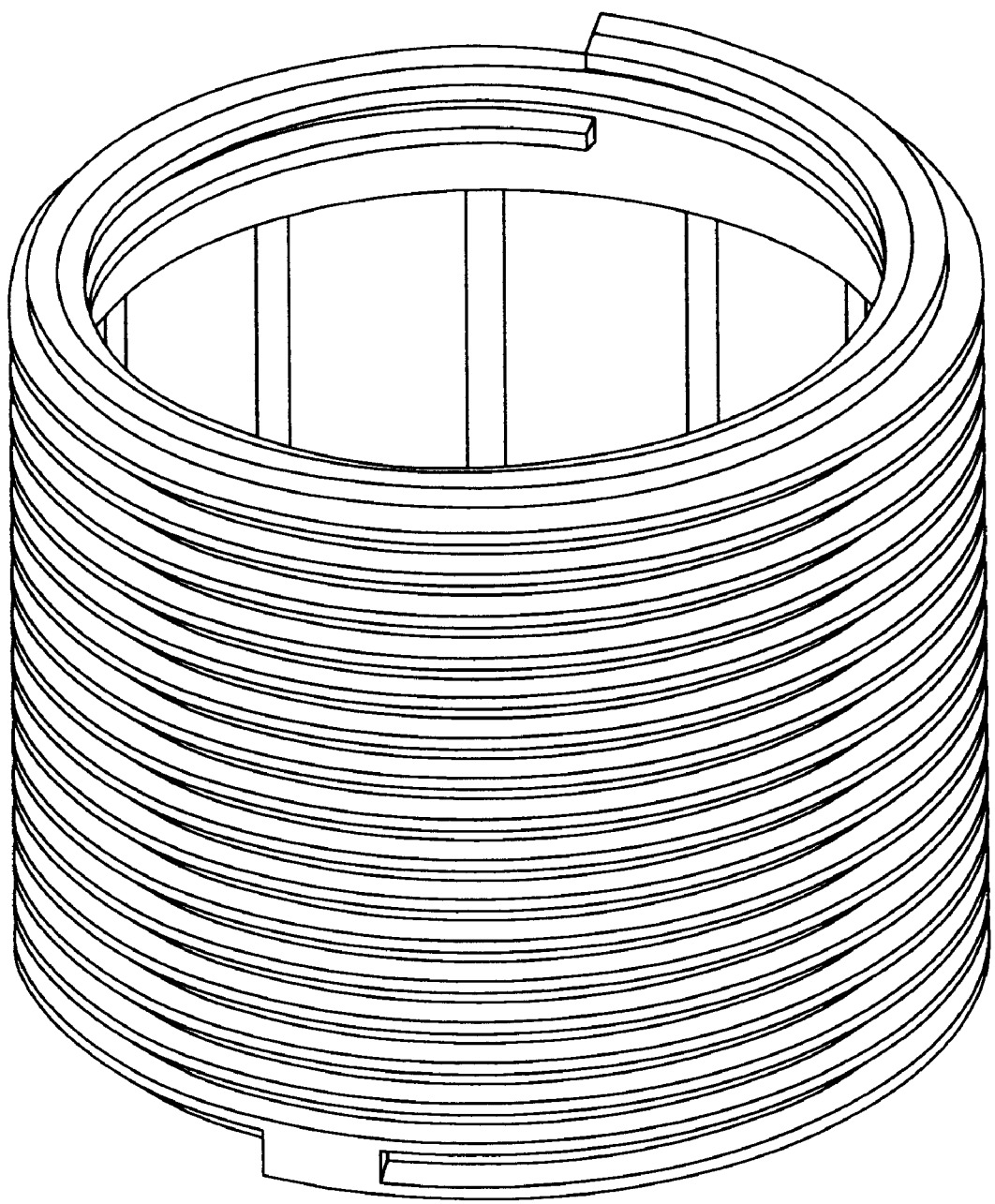
FIG. 12 shows one of the middle threaded elements, again in perspective representation shown from the top.
Figure 13:
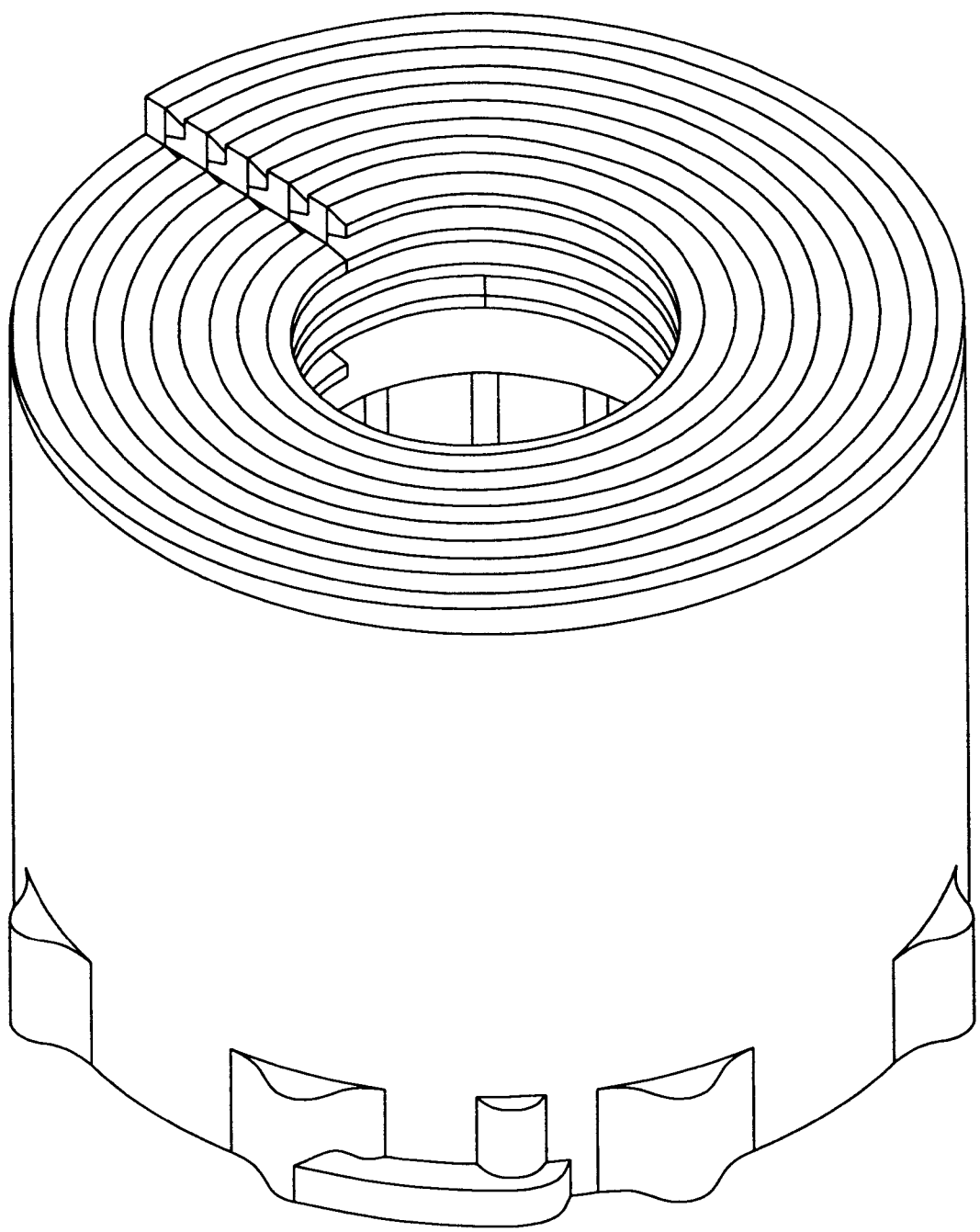
FIG. 13 shows a packet of threaded elements screwed into one another in perspective representation shown from the top.
Figure 14:
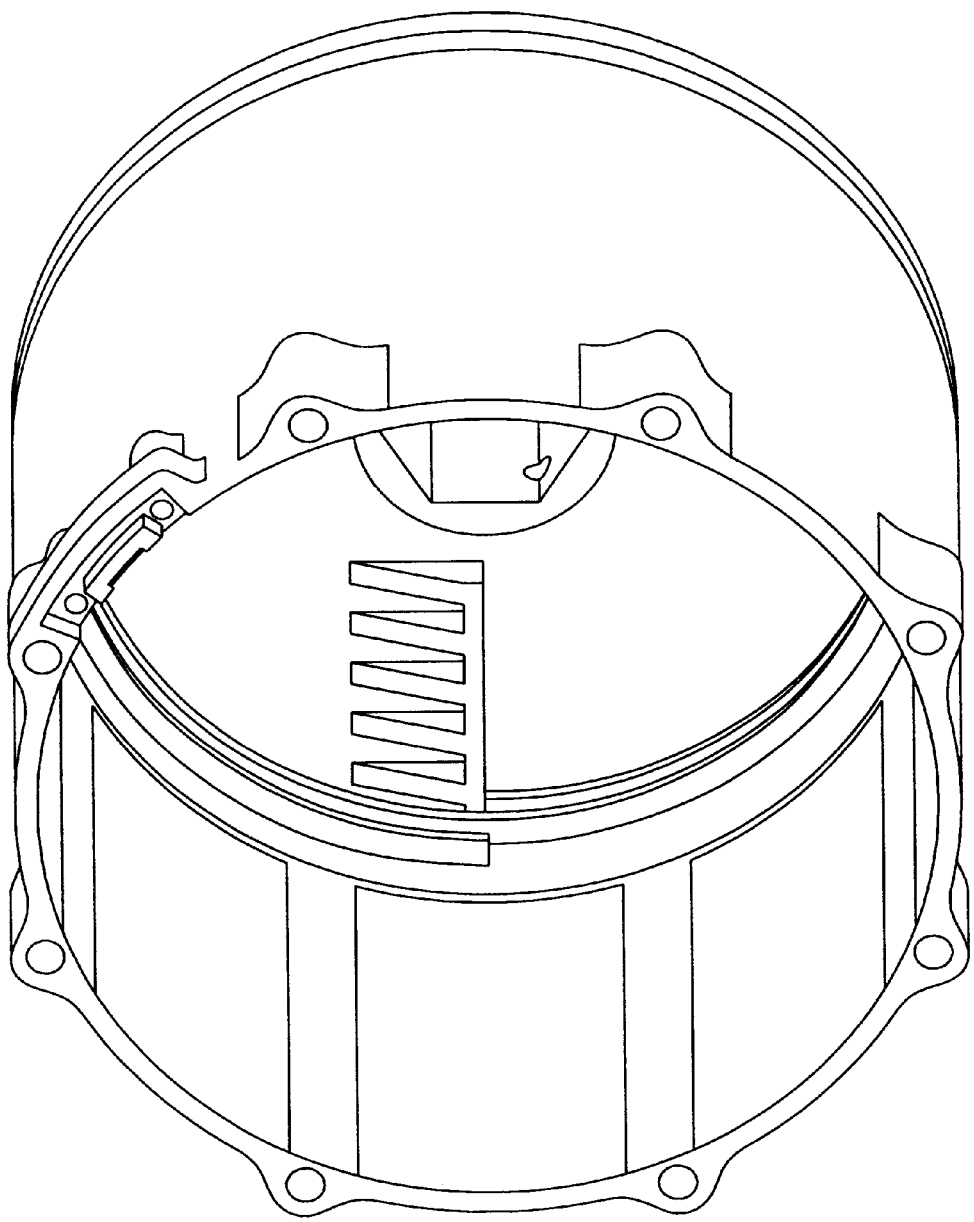
FIG. 14 shows the outer, stationary element of a packet of threaded elements in perspective view in its hollow inside space from the bottom, and also a driver plate with stop bar and reinforcing ribs.
Figure 15:
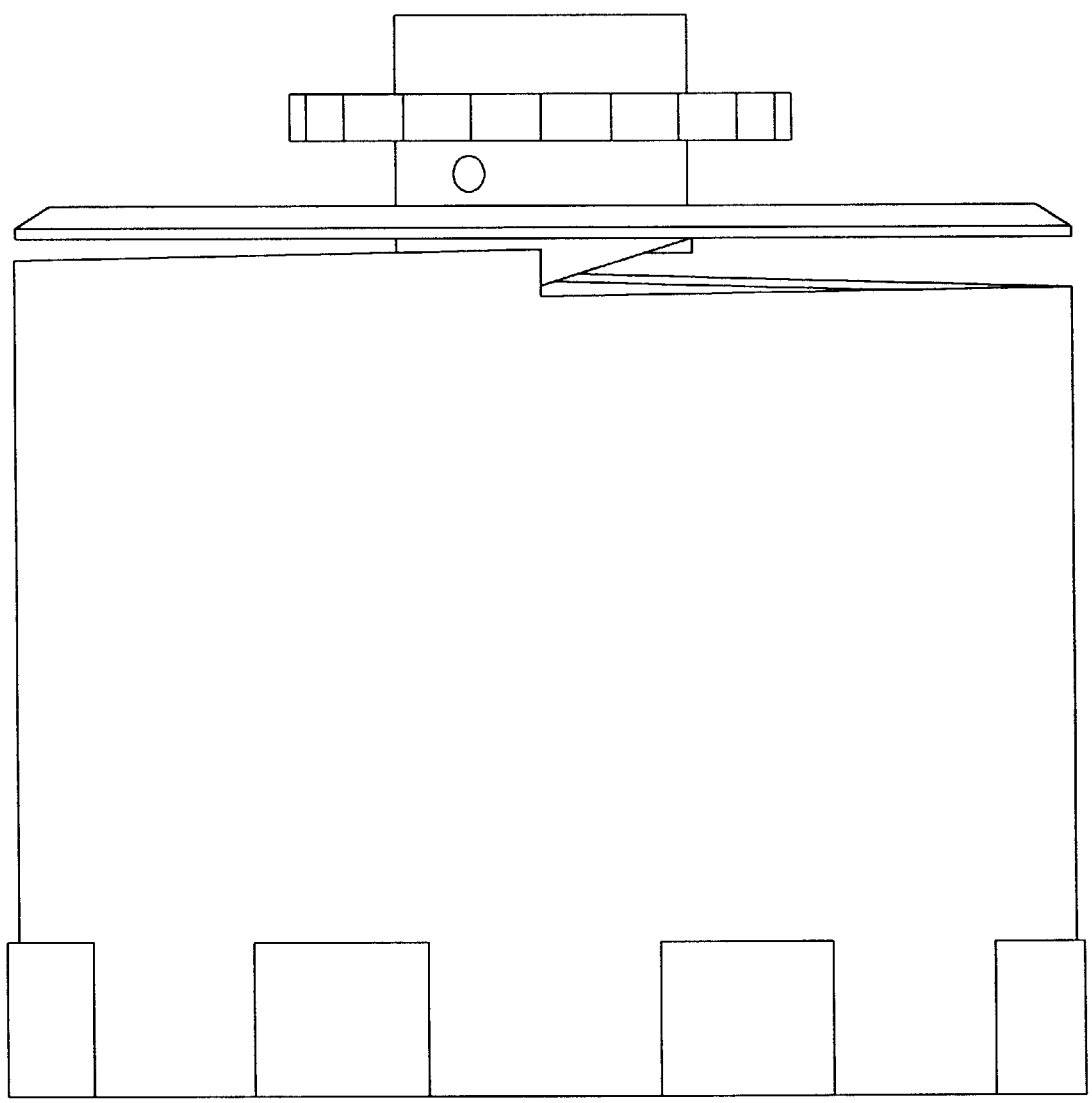
FIG. 15 shows the subject of FIG. 14 in a side view, together with a drive pinion as well as with the stop bar.
Figure 16:
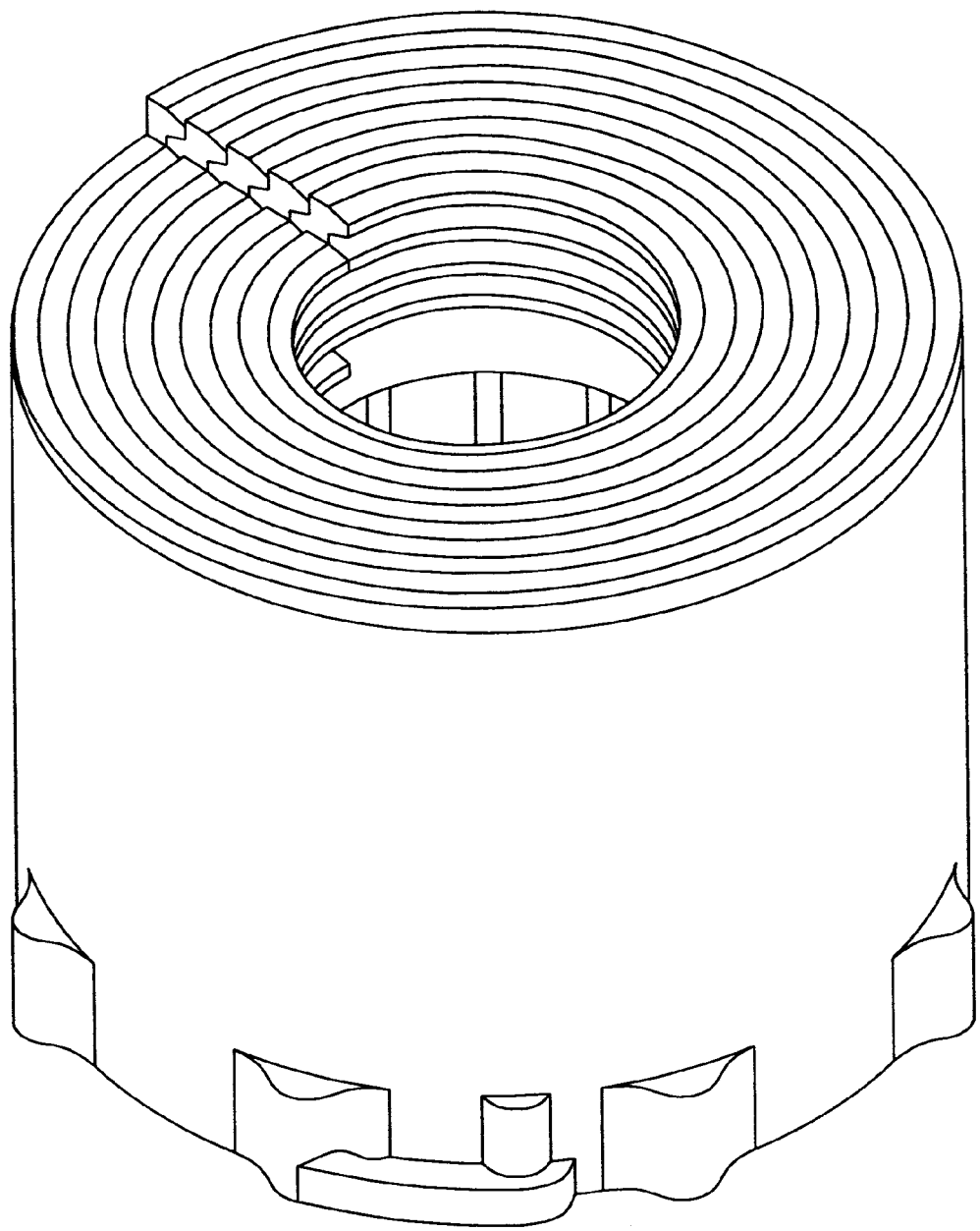
FIG. 16 shows the entire packet in perspective view obliquely from the top.

In the case of FIGS. 6 to 8, drive 3 is not arranged in the upper, but rather in the lower region of the columns. This has the advantage that the center of gravity of the wheelchair plus lifting device is lower, which increases safety.

An interesting variant is comprised of the following: The wheelchair must not be raised in its entirety. The construction can be configured in such a way that only the intrinsic seat unit—seat with support—is raised, but not the frame. This remains at the bottom. This means that the user of the wheelchair can go to a higher level by pressing on a button, with the wheels gripping the floor. He can undertake this during travel.

The lifting device is surrounded by a shock absorber 4, which prevents the user from erroneously grasping the gearing with the fingers and thus wounding himself and which also protects the lifting device against contamination from the outside.

The threaded elements shown in FIGS. 9 to 18b have a special feature. In order to prevent the complete excursion of one element from a neighboring element, stop surfaces are provided, which are formed from the front surfaces of the threaded turns, also from special stops. This is seen particularly well in FIG. 9. A total of seven threaded elements 1.1, 1.2, 1.3, 1.4, 1.5, 1.6, 1.7 are provided therein. As can be seen, for example, stop 12 and threaded element 1.5 form a pair of stop surfaces with one another—see the arrow.

FIGS. 10 to 13 can be understood from this. They also can show the principle.

In contrast to the forms of embodiment according to FIGS. 1 to 8, no stop elements such as elements 1.2.1, 1.3.1 or 1.4.1 in FIG. 1a are required. This has a double advantage:

First of all, structural height is spared. Secondly, a wedging is avoided. In particular, the stop surfaces, which can be seen in FIG. 16 on the upper side at the end of the individual threaded turns were taken care of. These stop surfaces each time run in an axial plane.

Figure 17:
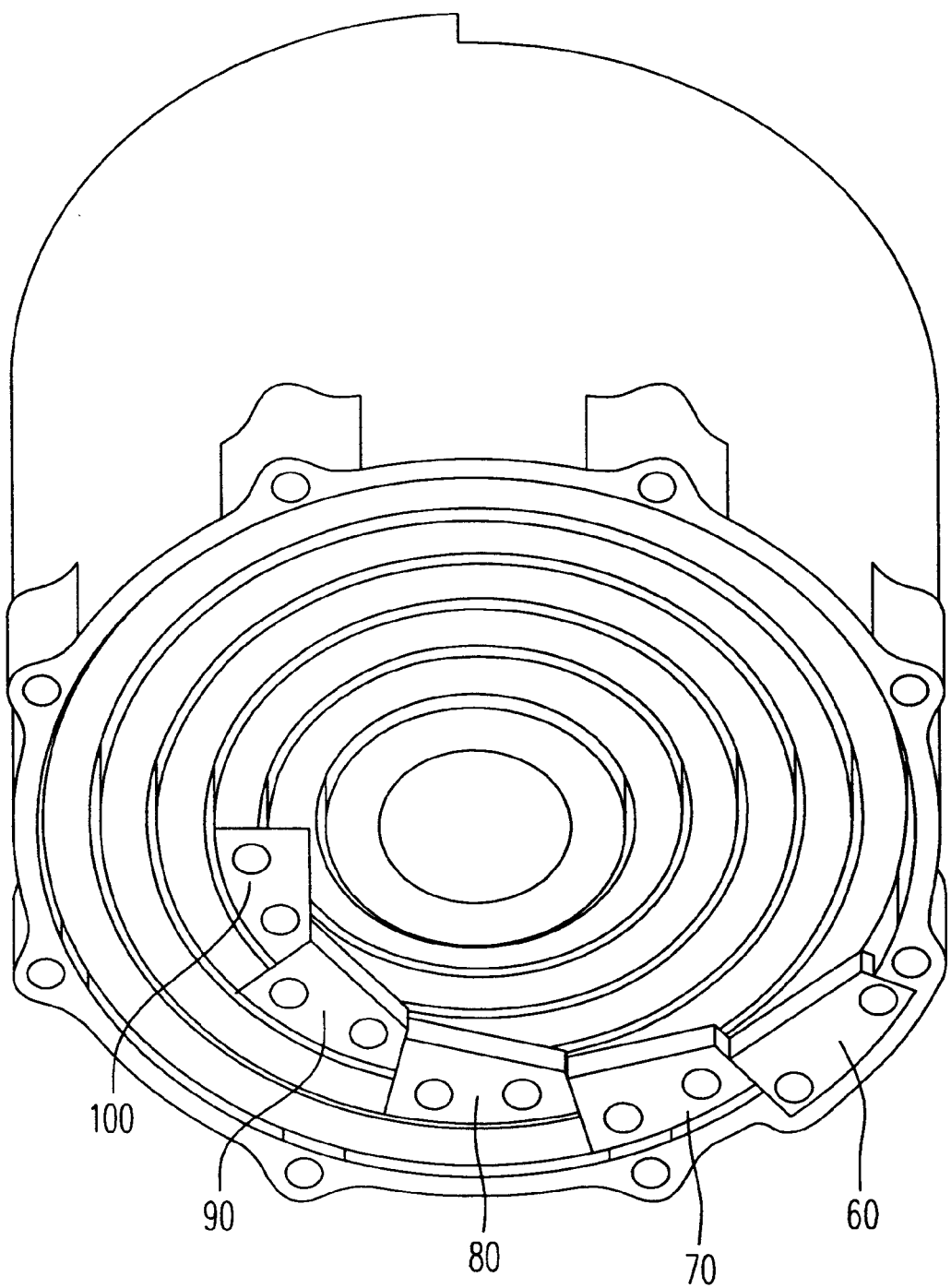
FIG. 17 shows the entire packet in perspective view obliquely from the bottom.

Stop elements 60 to 100 are recognized from FIG. 17. Each stop element is fixed to one of the telescopic elements of the entire telescopic packet. Two stop elements adjacent to one another stop each other, and in fact, again in axial planes, thus not in planes perpendicular to the axis. It is understood that the planes of the stop surfaces need not be pure axial planes. Rather, the planes could also be inclined opposite the axial planes. The fact is that there is no wedging.

Figure 18A:
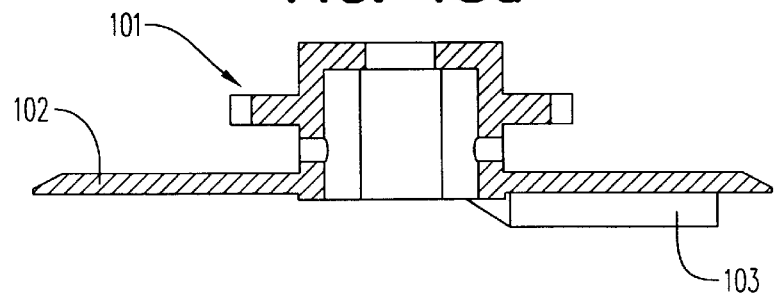
FIG. 18a shows the drive pinion in a sectional view A—A in FIG. 18.
Figure 18:
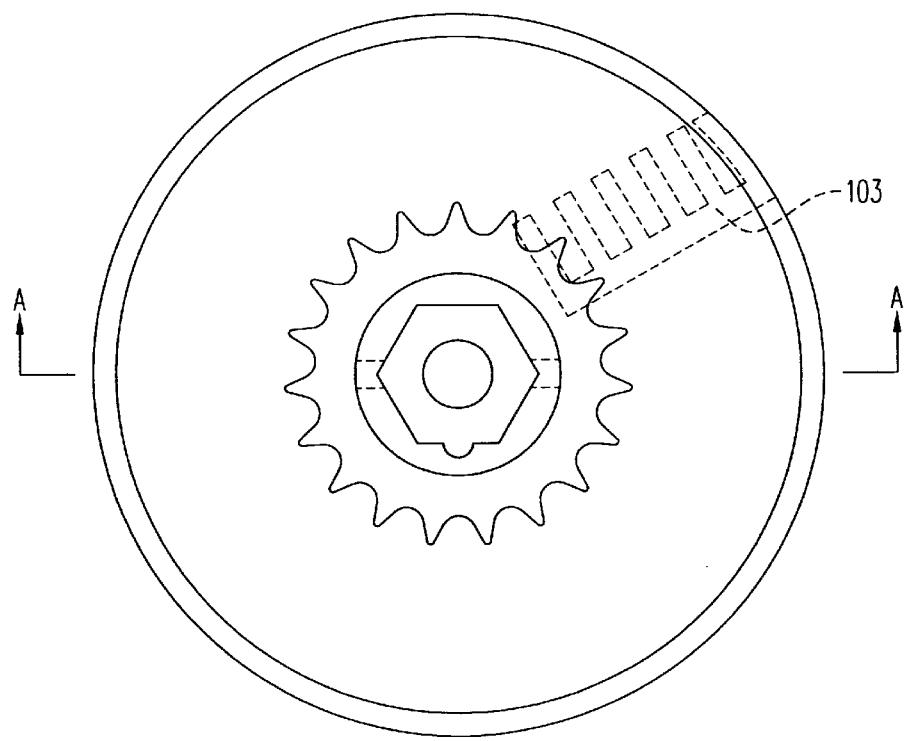
FIG. 18 shows driving pinion and packet in a top view with stop bar 103.
Figure 18B:
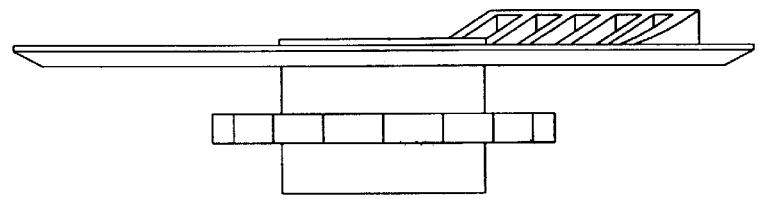
FIG. 18b again shows the drive pinion in the opposite direction of view.
Figure 19:
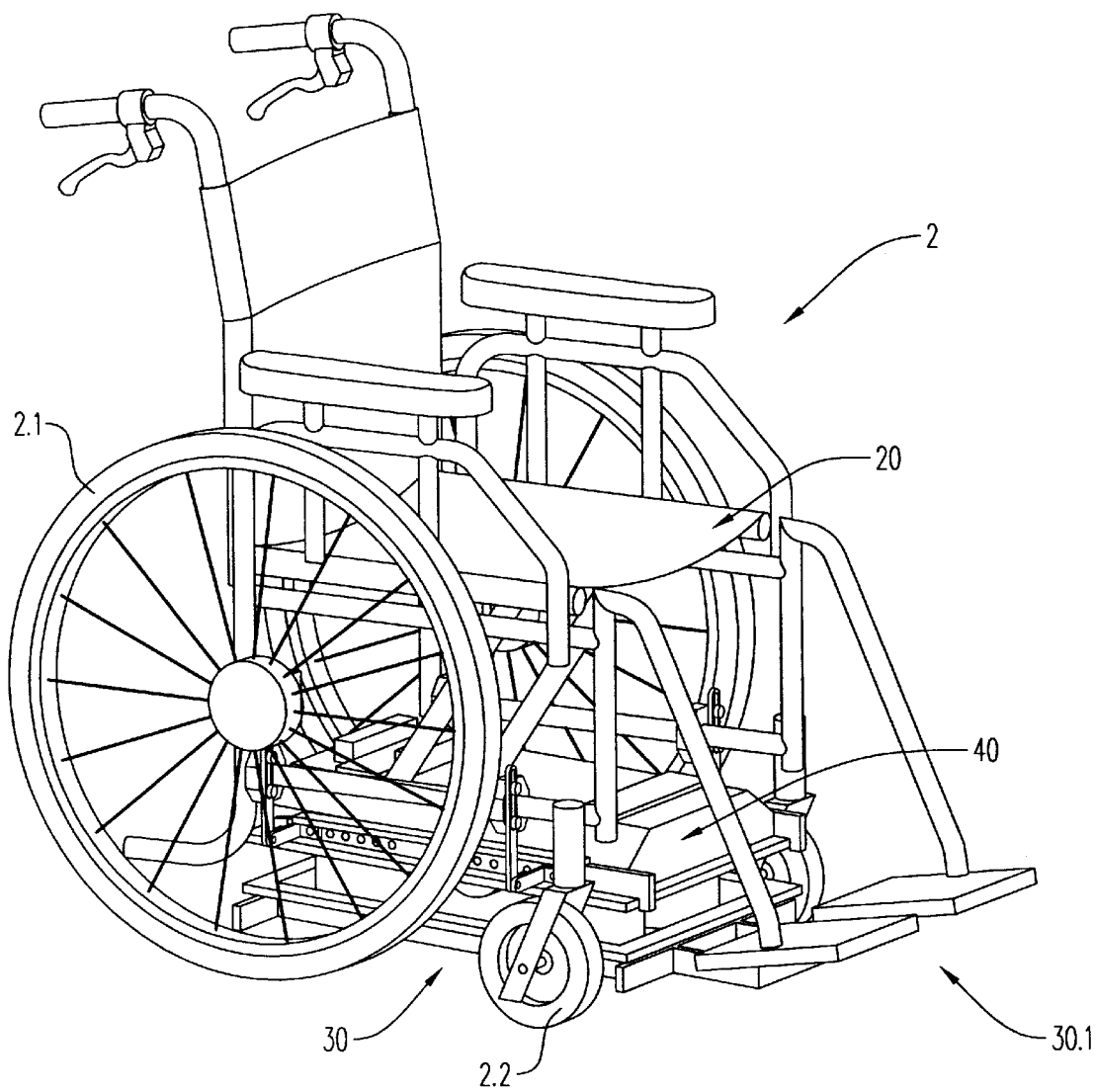
FIG. 19 shows a complete wheelchair with built-in lifting device.
Figure 20:
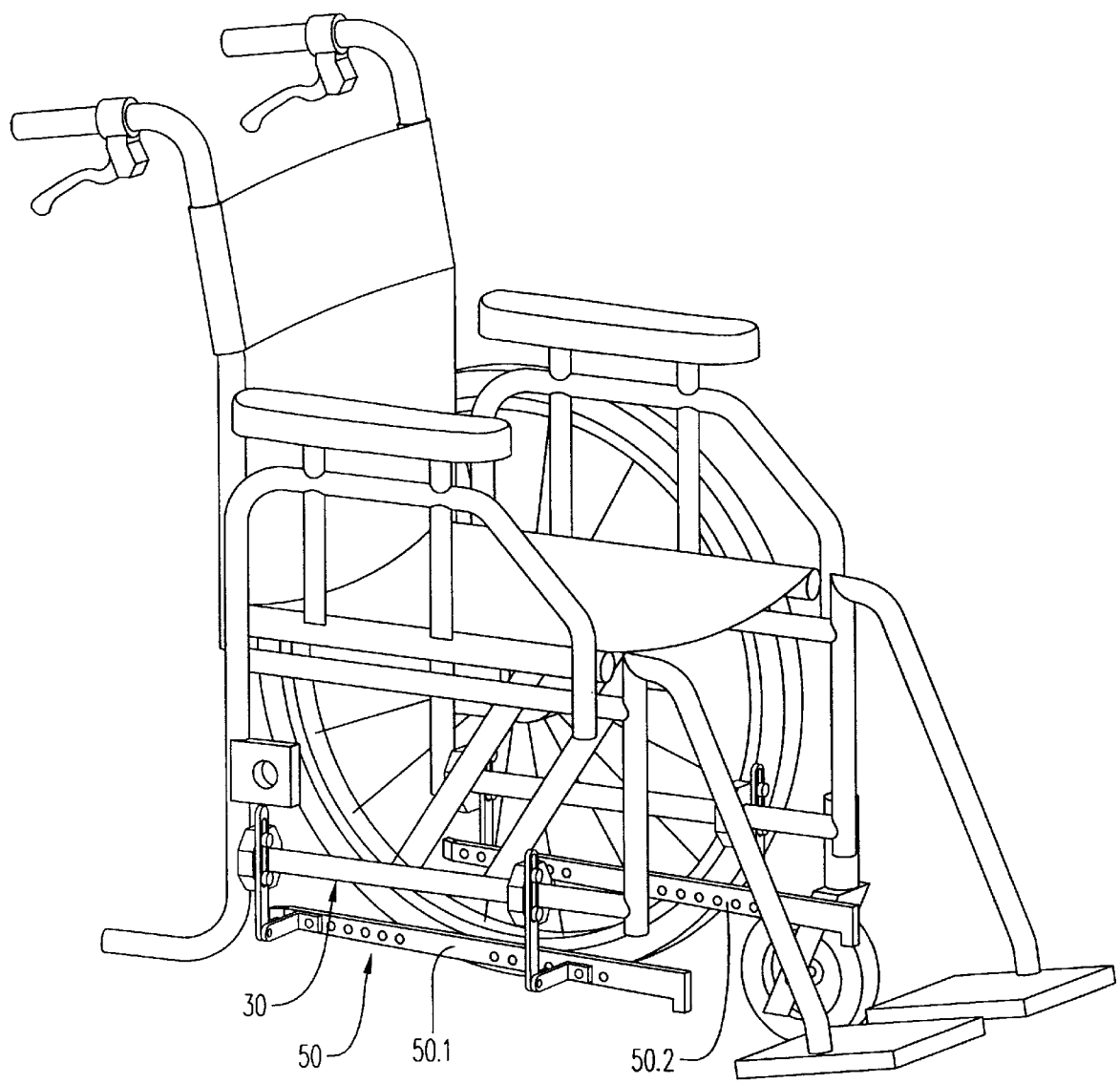
FIG. 20 shows the subject of FIG. 19 with wheels removed on the right side and lifting device removed in a perspective view.
Figure 21:
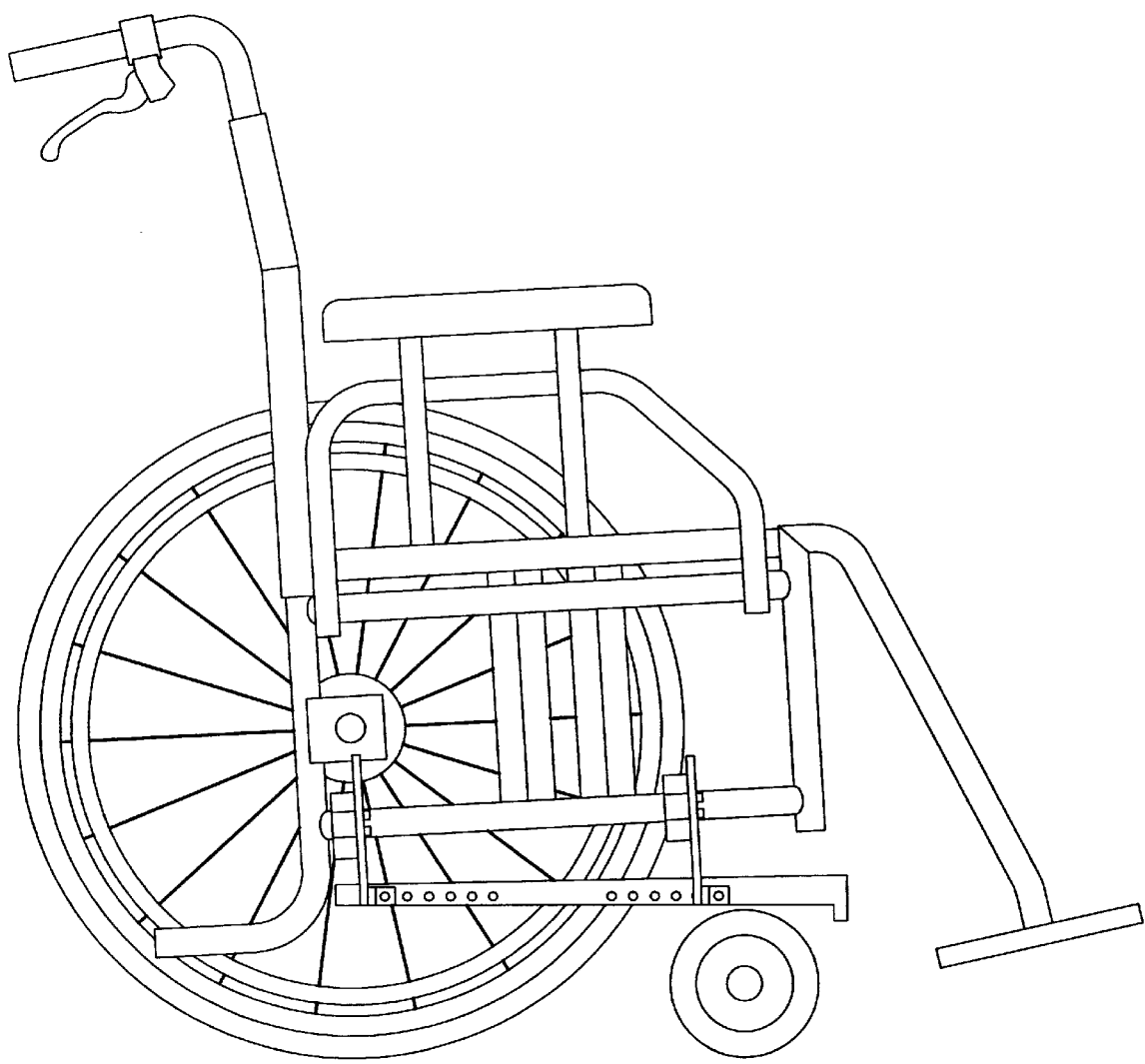
FIG. 21 shows the subject of FIG. 20 in side view.

In the form of embodiment according to FIGS. 18, 18a and 18b, one recognizes the drive pinion 101. This is made up in one piece with a disk 102. A stop bar 103 is found on this disk, at which [bar] stop surfaces recognizable in FIG. 16 stop in the retracted state of the entire telescopic packet. Stop bar 103 still also has the task of entraining the individual threaded elements downward along the way. This is therefore particularly advantageous, since the torsional surfaces are transferred to the individual threaded elements. If this were not the case, then all of the torsional forces would principally load the uppermost threaded element, which is smallest in diameter. Also, no wedging occurs with the stop of the threaded upper front ends of the individual threaded elements and stop bar 103 in the case of the form of embodiment according to the invention.

FIGS. 19 to 24 principally illustrate the lifting device in its relationship to the wheelchair or to its frame. Thus, one recognizes in FIG. 19 a wheelchair 2 with its wheels 2.1, 2.2. The wheelchair comprises a seat 20, a frame 30, as well as a lifting device 40.

Figure 22:
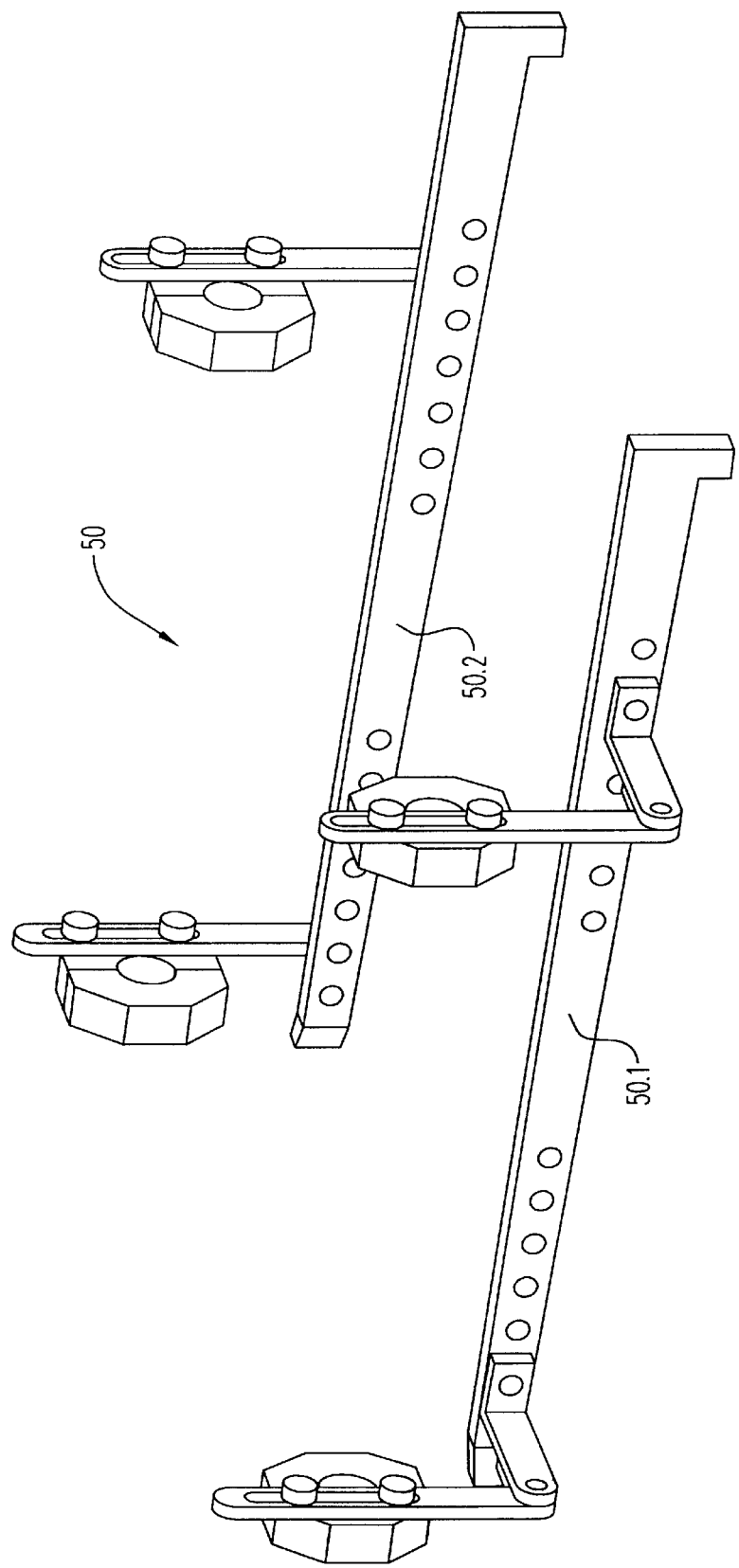
FIG. 22 shows an uptake device for taking up the lifting device.

In FIG. 22, one recognizes an uptake device 50. This comprises two holders 50.1, 50.2, which taper from front to back. The uptake device 50 is rigidly screwed onto frame 30. As can be seen from FIG. 23, lifting device 40 has corresponding slide guides, into which holders 50.1, 50.2 can be inserted. This insertion is made by resting lifting device 40 on the floor, and the wheelchair driver travels backward, so that tapering holders 50.1, 50.2 are inserted into the named slide guides. An insertion in the forward direction is not possible, since footrests 30.1 would be in the way.

Figure 23:
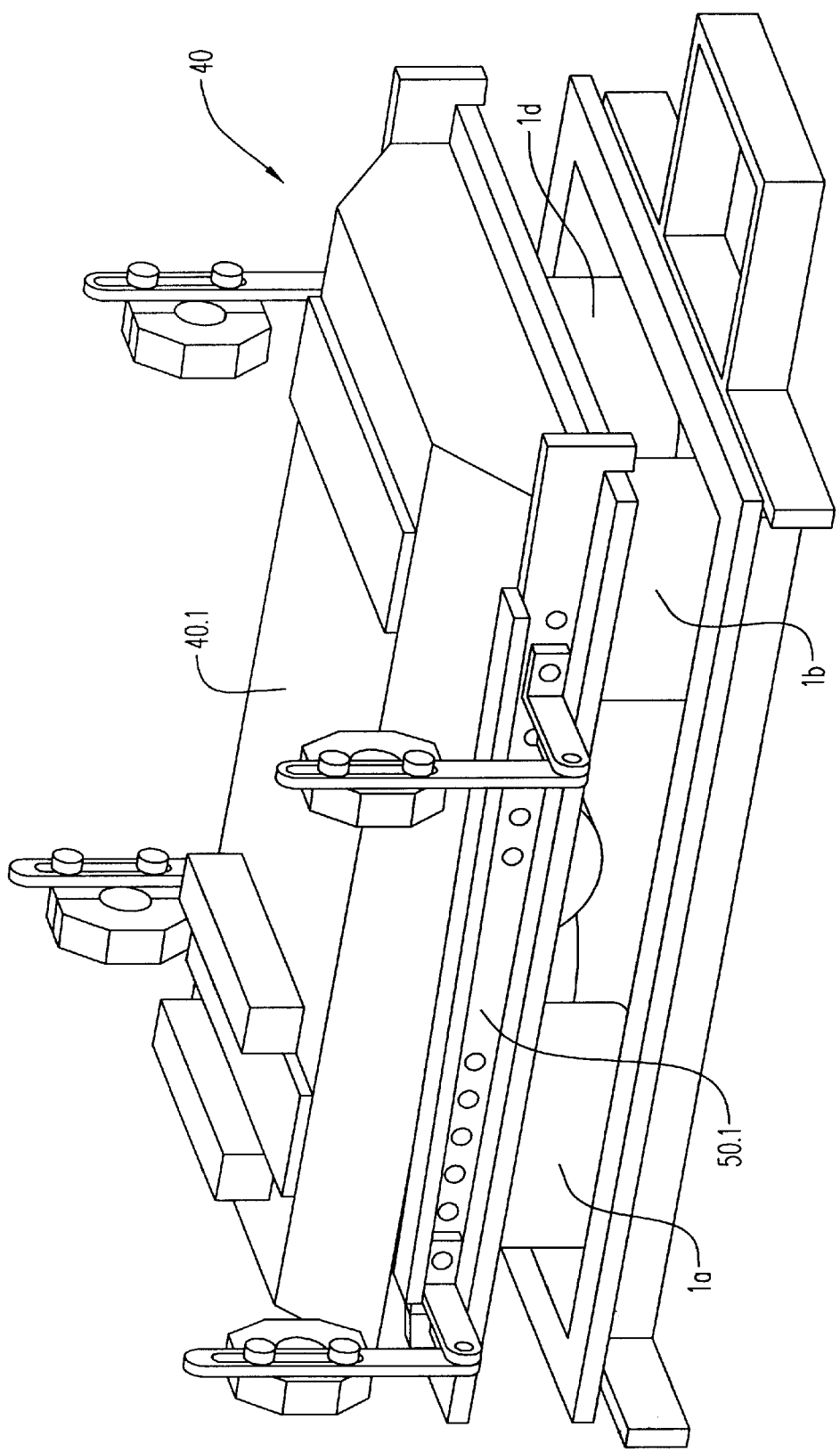
FIG. 23 shows the lifting device with the uptake device.
Figure 24:
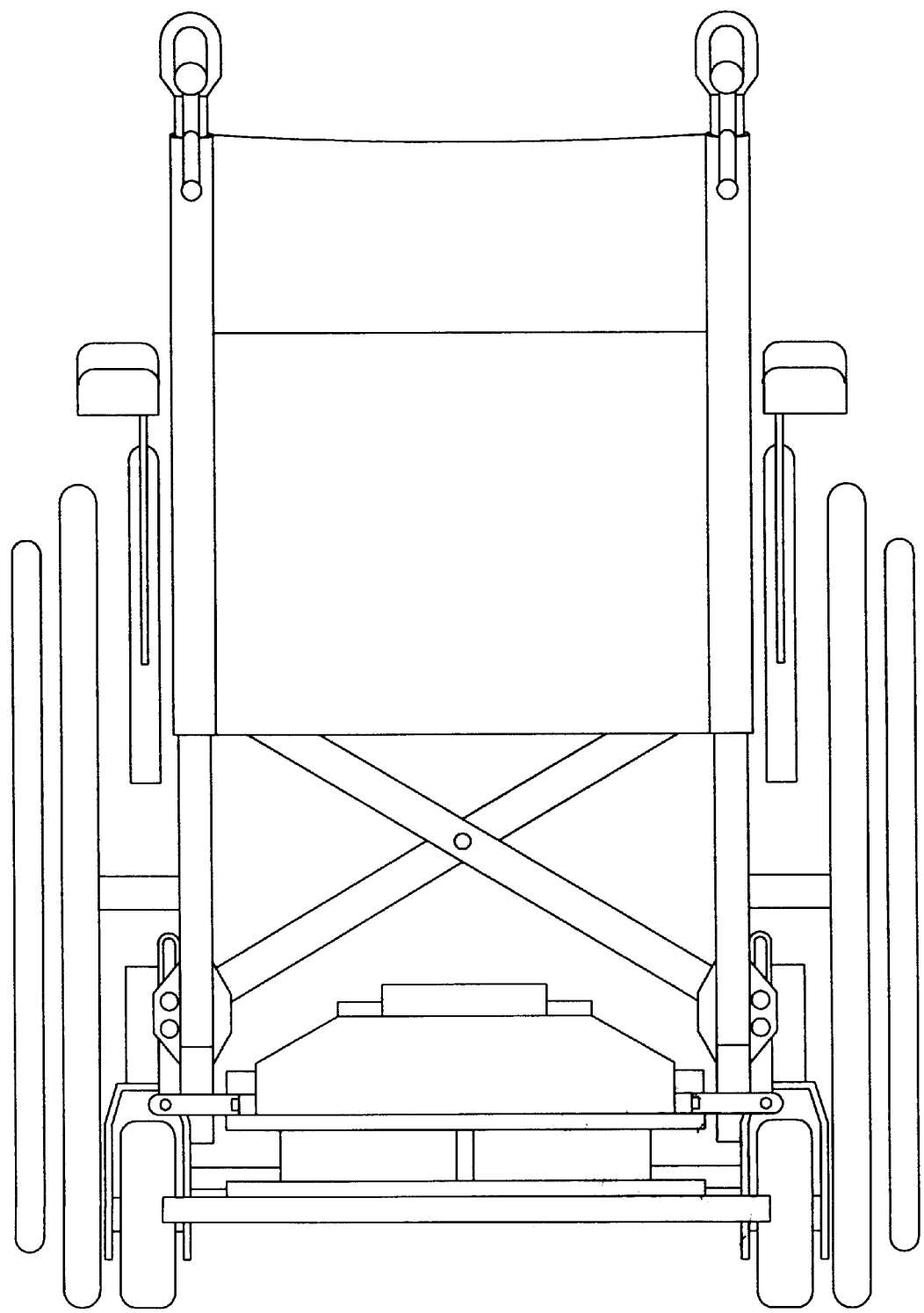
FIG. 24 shows a wheelchair according to the invention in a view from the back.

Lifting devices 1a, 1b, and 1d are also recognized from FIG. 23. One lifting device 1c is thus concealed. The lifting devices are constructed as is shown in FIGS. 9 to 13. These involve four columns, which are comprised of threaded elements; the threaded elements can be telescoped.

Lifting device 40 comprises in its upper region a case-type container 40.1. This serves for the uptake of the battery for the drive.

What is claimed is:

1. A wheelchair for the handicapped, said wheelchair comprising:

a frame with a set of wheels;

a seat;

a lifting device adapted to raise and lower one of said seat and said seat and said frame, said lifting device comprising a plurality of elements that together form a column and are nested for operation like a telescopically, said plurality of elements including at least one middle element and two end elements, said at least one middle element and a first one of said two end elements having outer threads, said at least one middle element and a second one of said two end elements having an inner thread, wherein said first and second end elements have a longitudinal axis; and a drive arranged to rotate one of the first and second two end elements around said longitudinal axis in either direction to raise and lower said one of said seat and said seat and said frame.

2. The wheelchair according to claim 1, further comprising a plurality of stops that prevent a complete excursion of one of said plurality of elements from an adjacent one of said plurality of elements and that guide and take up bending forces that may occur.

3. The wheelchair according to claim 1, wherein said column is one of at least three columns that are arranged parallel to one another, and wherein said drive rotates either said first or said second end element of each column.

4. The wheelchair according to claim 3, further comprising:

at least three drive wheels, each of said drive wheels being located at a different one of said columns, each drive wheel being joined with either said first or said second end element of its associated column;

a central drive wheel that lies in one plane with said drive wheels of the individual columns, said drive including a drive motor that drives said central drive wheel; and a belt that loops around said central drive wheel and said drive wheels of the individual columns in a manner that provides a lock-and-key fit between said belt and said central drive wheel and said drive wheels.

5. The wheelchair according to claim 3, wherein said outer and inner threads are trapezoidal threads or sawtooth threads.

6. The wheelchair according to claim 5, wherein said outer threads form one or more threaded turns, each threaded turn having a front surface, and wherein a plurality of stops is formed from said front surfaces in order to prevent the complete excursion of a first one of said plurality of elements from an adjacent one of said plurality of elements.

7. The wheelchair according to claim 1, wherein said seat and said frame can be commonly raised and lowered.

8. The wheelchair according to claim 1, wherein said lifting device is a self-contained unit that is capable of being coupled to said frame.

9. The wheelchair according to claim 8, further comprising an uptake device connected to said frame for the uptake of said lifting device, and wherein said uptake device and said lifting device are configured and arranged such that said coupling of said uptake device to said frame can be conducted by backward travel of the wheelchair along a surface when said lifting device lies on said surface.

10. The wheelchair according to claim 9, wherein said lifting device comprises a container for uptake of a battery for said drive.

11. The wheelchair according to claim 3, wherein at least two of said plurality of elements in each of said columns have a front side that includes a stop, and wherein said stops form stop surfaces.

12. The wheelchair according to claim 11, wherein said inner and outer threads form one or more threaded turns, and wherein said stop surfaces are located in a region of an upper or a lower end of said threaded turns of said at least two elements in each column, and wherein said each of said stop surfaces is arranged in an axial plane with respect to said longitudinal axis.

13. The wheelchair according to claim 12, wherein said axial plane is generally perpendicular to said longitudinal axis.

14. The wheelchair according to claim 13, further comprising:

a drive element that is located on the upper end of one or more of said at least three columns, said drive element including a stop bar and a drive motor with a drive gear, and a drive pinion that meshes with said drive gear, wherein said stop bar engages the individual stop surfaces of the individual elements of said at least three columns, and wherein said drive pinion and said stop bar are borne by a disk that is perpendicular to said longitudinal axis.

* * * * *